(12) United States Patent
Nigro

(10) Patent No.: US 12,153,708 B2
(45) Date of Patent: Nov. 26, 2024

(54) MESSAGING SYSTEM

(71) Applicants: Social Media Emotions S.r.l., Vicenza (IT); Filippo Nigro, Vicenza (IT)

(72) Inventor: Filippo Nigro, Vicenza (IT)

(*) Notice: Subject to any disclaimer, the term of this patent is extended or adjusted under 35 U.S.C. 154(b) by 268 days.

(21) Appl. No.: 17/603,338

(22) PCT Filed: Apr. 16, 2020

(86) PCT No.: PCT/IB2020/053605
§ 371 (c)(1),
(2) Date: Oct. 13, 2021

(87) PCT Pub. No.: WO2020/212900
PCT Pub. Date: Oct. 22, 2020

(65) Prior Publication Data
US 2022/0198056 A1    Jun. 23, 2022

(30) Foreign Application Priority Data
Apr. 17, 2019   (IT) .................. 102019000005996

(51) Int. Cl.
*H04L 29/06*     (2006.01)
*G06F 21/62*     (2013.01)
*H04L 51/063*    (2022.01)
*H04L 51/216*    (2022.01)

(52) U.S. Cl.
CPC ........ *G06F 21/6245* (2013.01); *H04L 51/063* (2013.01); *H04L 51/216* (2022.05); *G06F 2221/031* (2013.01); *G06F 2221/032* (2013.01)

(58) Field of Classification Search
CPC .......... G06F 21/6245; G06F 2221/031; G06F 2221/032
See application file for complete search history.

(56) References Cited

U.S. PATENT DOCUMENTS

| | | | |
|---|---|---|---|
| 9,203,791 B1* | 12/2015 | Olomskiy | G06F 21/84 |
| 2015/0007351 A1 | 1/2015 | Janajri | |
| 2016/0057093 A1* | 2/2016 | Seo | H04L 51/063 |
| | | | 715/752 |
| 2016/0094495 A1 | 3/2016 | Ahuja | |
| 2018/0219812 A1* | 8/2018 | Hanson | H04W 12/68 |
| 2020/0089910 A1* | 3/2020 | Paz | G06F 21/629 |

* cited by examiner

*Primary Examiner* — Jason K Gee
(74) *Attorney, Agent, or Firm* — Themis Law

(57) ABSTRACT

A messaging system includes a sending device and a recipient device communicating through a central unit, a first software module loaded and executed in the sending and recipient devices, and a second software module loaded and executed in the central unit, the first and second software modules creating, managing, and exchanging: items of a first open type that include a chat, a message, or a digital element that are always visible on a screen of a device display, and items of a second reserved type that include a chat, a message, or a digital element that switch between a visible state in which they displayed, entirely or as a preview, on a specific area of the screen, and a hidden state in which they are not displayed on the screen and also do not occupy the specific area of the screen, which they occupy instead when in the visible state.

19 Claims, 12 Drawing Sheets

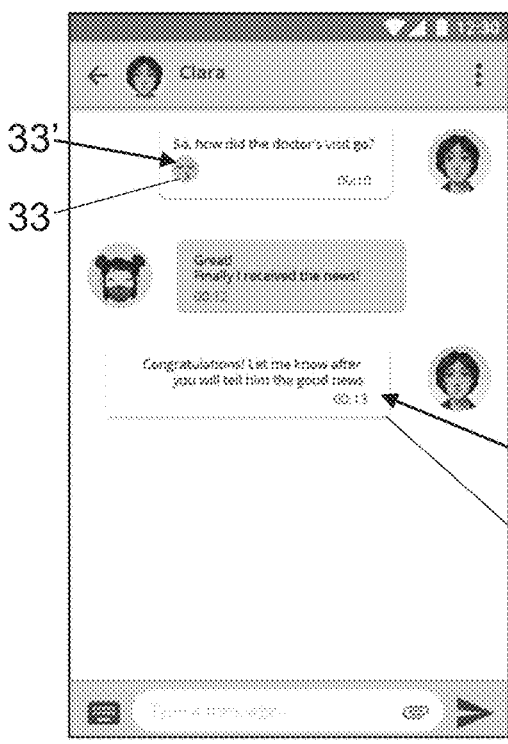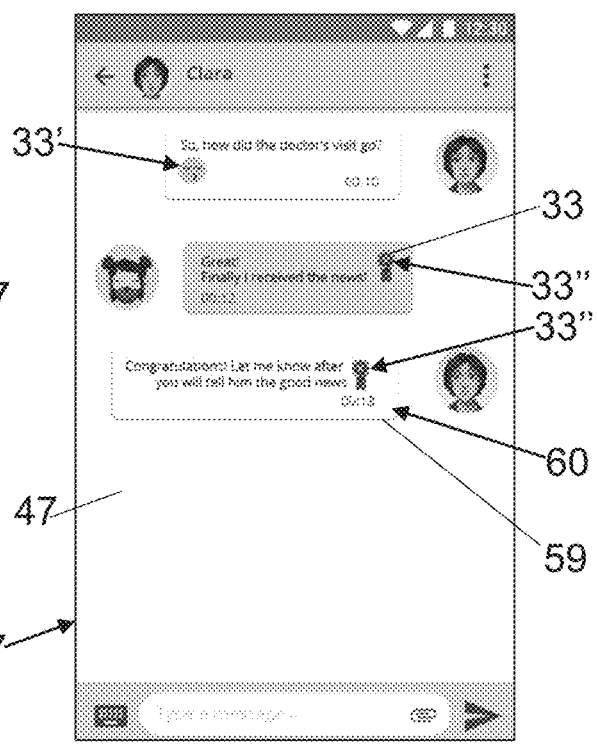
FIG. 11a  FIG. 11b
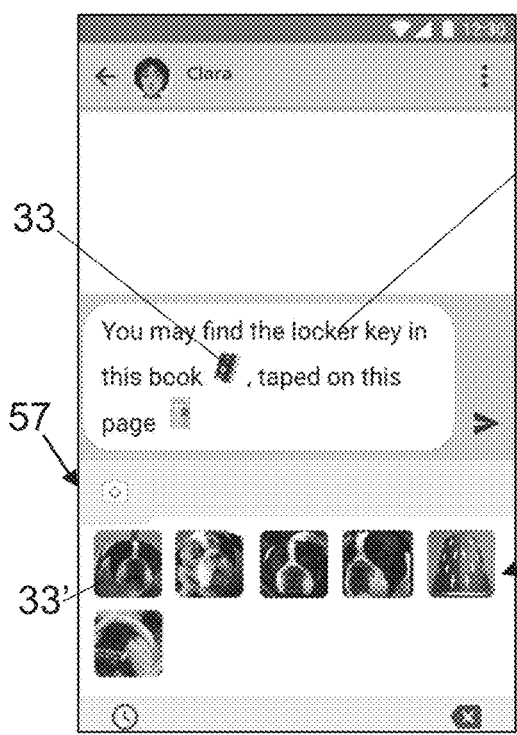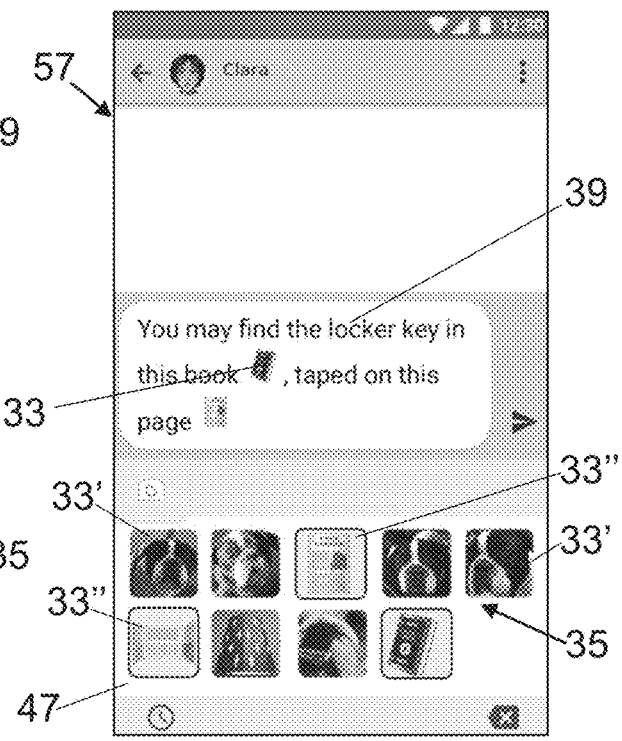
FIG. 12a  FIG. 12b

MESSAGING SYSTEM

FIELD OF THE INVENTION

The present invention relates to an improved messaging system, preferably instantaneous.

BACKGROUND OF THE INVENTION

Currently the privacy and security of the messages exchanged through the known messaging systems are obtained through end-to-end encryption and, in particular, in this way it is ensured that only the sender and the recipient can read and view what is sent, and no one else, not even the messaging system manager. However, all this happens automatically, i.e. without activating particular settings and without creating special secret chats, and therefore—once have accessed the sender and/or recipient's device—the content of the individual messages or chats is essentially freely viewable.

In essence, therefore, currently, access to the chats, messages and content provided within a user's messaging system is exclusively subject to the correct passing of the recognition system (by password, access codes or fingerprint) designed to access the functionality of the entire device (and this both at power-on and from a standby condition).

Therefore, to allow a third user, who is not the owner of a specific device, to freely use the messaging system present in that device, the owner of the latter must necessarily and preventively carry out the correct overcoming of the recognition system in so as to unlock all the functions of the entire device; however, in doing so, the third party user would be able to completely and indistinctly view all the content present in the messaging system of the owner's device and, in particular, could also view a series of conversations and/or messages that the owner, for various reasons, it may want to keep private. Basically, there are situations in which the owner of a device wants/must allow access (both in terms of viewing and use) of the messaging system to a third party user, but at the same time, wants to prevent the latter from viewing entirely and indiscriminately how much content (in terms of conversations, messages and elements in general) is present in the messaging system itself.

In this regard, currently, within the well-known instant messaging systems, there is no possibility to hide certain messages from a chat, nor the possibility to hide a graphic and/or audio element (for example an emoji, a sticker and/or any multimedia element) inserted in a message and, even less, there is the possibility to hide an entire chat, be it a chat between only two users or between multiple users ("group").

Therefore, in some situations, the user of a messaging system—both as a sender and as a recipient—needs to hide, within the system itself, both the existence and the content of an entire chat. and/or message and/or a graphic and/or audio element and thus allow their display on the device display only following a prior unlocking and recognition operation.

US2015/007351 basically proposes a system of "censorship" or "masking" of the message, which is thus sent empty or cut in some of its parts. The recipient will receive the message and can unlock, by clicking on a corresponding button, the complete display of the message, in order to correctly understand its content.

US2016/094495 describes a keyboard with various solutions for concealing the message, such as for example by means of anagrams or elimination of some terms (prepositions, pronouns, conjunctions, etc.). The correct reconstruction of the message, in order to allow understanding of its content, can then be unlocked with a button.

US2018/219812 describes a solution in which the message is sent empty or obscured, to then be displayed—in order to allow understanding of its content—via a button that activates the Touch ID (fingerprint).

US2015/007351, US2016/094495 and US2018/219812 propose solutions to avoid unwanted situations in which a third party peeks at the display of someone else's device bringing his gaze beyond the shoulder of the owner/manager of said device, in order to be able to see and spy on content present on the display itself. These known solutions are not, however, suitable to guarantee adequate confidentiality in cases where, without the consent of the legitimate owner/operator of the device (for example as a result of theft or loss of this) or even with his consent, a third party come into possession of said device so that can manage it directly and freely, for example by accessing the release buttons, etc.

Furthermore, US2015/007351, US2016/094495 and US2018/219812 propose solutions for "masking" the text of the message, while the presence of the message itself remains visible. In particular, the frame containing the message text remains visible, even if it is empty inside or its text is obscured, cut or shuffled in various ways. Therefore, in this case, the third party who comes into possession of someone else's device always notices the existence of a message, even if he is then unable to understand its content; in other words, in the solutions of US2015/007351, US2016/094495 and US2018/219812, although the third party is unable to read and understand them, he still learns that there are confidential and secret messages.

Furthermore, the solutions of US2015/007351, US2016/094495 and US2018/219812 are configured, always and only, so that the text of the messages exchanged is obscured, and therefore not understandable, both for the sender and for the recipient of said messages. Therefore, they do not allow to manage a situation in which the text of a message, or even the presence of an entire chat, must be invisible to the sender only, and not to the recipient (s), or vice versa.

SUMMARY OF THE INVENTION

The object of the present invention is to propose a messaging system which allows to overcome the above mentioned drawbacks present in the traditional technique.

Another purpose of the invention is to propose a messaging system that allows to hide both the content but also the presence of a chat, a message or a graphic and/or audio element of a message, thus avoiding that an unauthorized subject notices their existence.

Another object of the invention is to propose a messaging system in which an unauthorized subject does not notice the existence of chats and/or messages and/or graphic and/or audio elements that are hidden.

Another object of the invention is to propose a messaging system that allows to hide a chat (i.e. an exchange of messages sent and received in the messaging system) so that the relative chat containment screen (chat room) is only viewable following a prior release and/or authorization procedure.

Another object of the invention is to propose a messaging system that allows to hide a chat (i.e. an exchange of messages sent and received in the messaging system) so that in the relative summary preview screen of a plurality of user chats appears viewable only following a prior release and/or authorization procedure.

Another object of the invention is to propose a messaging system that allows to hide a message, both sent and received by means of the messaging system, so that the relative frame for containing the message, as well as the message itself, can be viewed only after a prior release and/or authorization procedure.

Another object of the invention is to propose a messaging system that allows to hide a graphic and/or audio element present in a message, both sent and received through the messaging system, so that the space occupied by the graphic element and/or audio within the message, as well as the element itself, can only be viewed following a prior unlocking and/or authorization procedure.

Another object of the invention is to propose a messaging system that allows to hide a chat between multiple subjects ("group").

Another object of the invention is to propose a messaging system which allows to create a sub-chat between a group or even the users of a main chat.

Another object of the invention is to propose a messaging system which allows to use multiple systems to unlock access and display to the contents present in said messaging system.

Another object of the invention is to propose a messaging system which allows to share between two or more users the key to access and display the hidden contents present in said messaging system.

Another object of the invention is to propose a messaging system which allows to share, without the need of external means, the key to access and view the hidden contents present in said messaging system.

Another object of the invention is to propose a messaging system which is an improvement and/or alternative with respect to the traditional ones.

Another object of the invention is to propose a messaging system with an alternative characterization, both in functional and implementation terms, with respect to the traditional ones.

Another object of the invention is to propose a messaging system which is simple, easy and intuitive to use.

Another object of the invention is to propose a messaging system which allows a lower consumption of resources by the hardware devices involved and a lower use of the band occupied by the network.

Another object of the invention is to propose a messaging system that can be implemented simply, quickly and with low costs.

All these aims and others which will result from the following description are achieved, according to the invention, with the messaging system having the characteristics indicated in claim 1.

BRIEF DESCRIPTION OF THE DRAWINGS

The present invention is further clarified below in a preferred embodiment thereof, purely by way of non-limiting example with reference to the attached drawings, in which:

FIG. 11*a* shows a screen in which a chat is displayed with the related messages and graphical elements of the "open" type, while the graphic elements of the reserved type are in the hidden state, FIG. 11*b* shows the screen in FIG. 11*a* after the procedure for unlocking the display of the reserved type graphic elements, which thus pass from the hidden state to the visible state, FIG. 12*a* shows a screen in which a keyboard is displayed with only the "open" type graphic elements, while the graphic elements to be inserted of the reserved type are in the hidden state, FIG. 12*b* shows the screen in FIG. 12*a* after the procedure for unlocking the display of the reserved type graphic elements, which thus pass from the hidden state to the visible state, FIG. 13 show in sequence the various screens displayed during the procedure for unlocking the display of a chat of a reserved type, FIG. 14 *a-c* show in sequence the various screens displayed during the access procedure to a chat of a reserved type.

DETAILED DESCRIPTION OF EMBODIMENTS OF THE INVENTION

Figure 1:
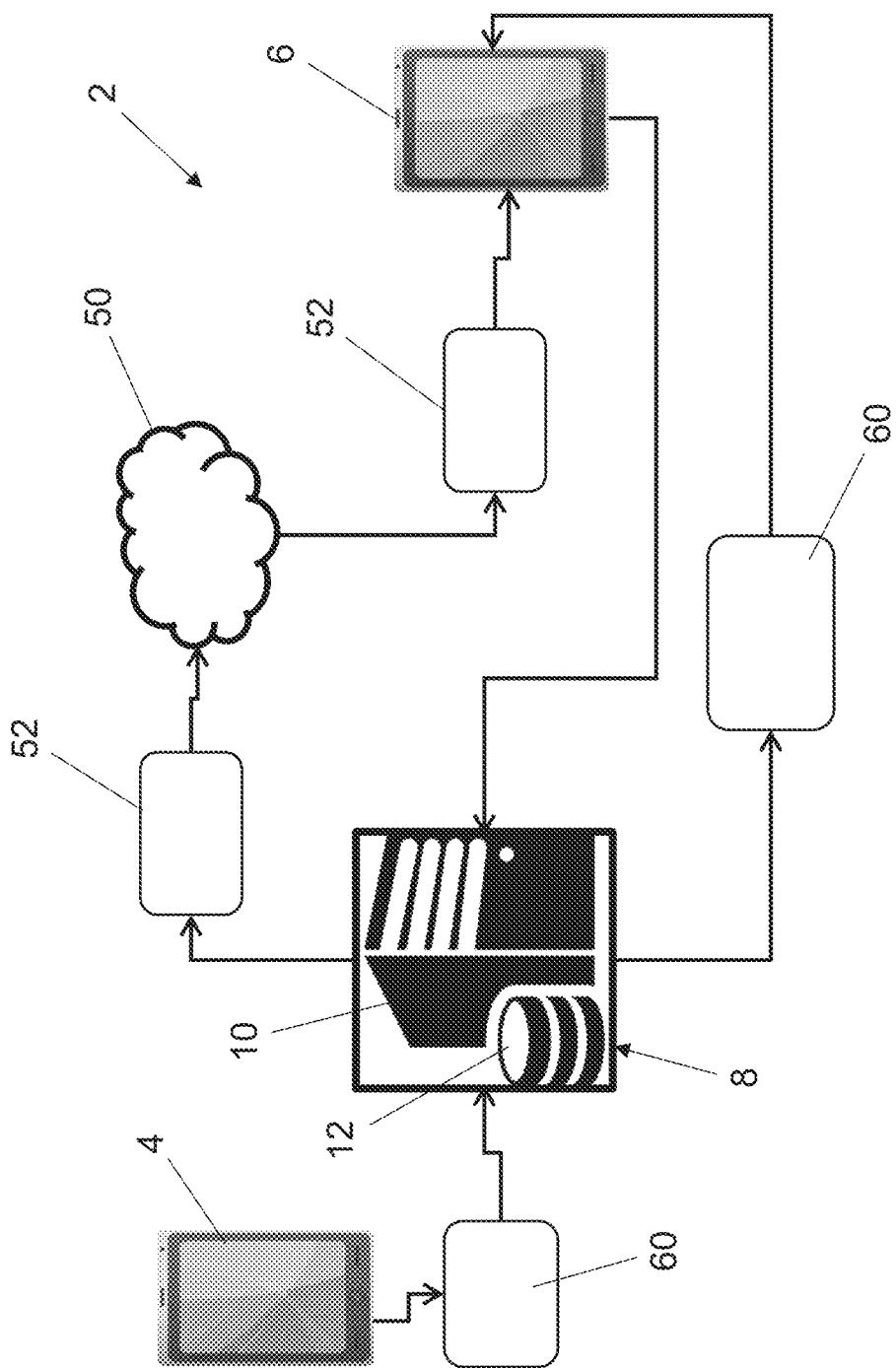
FIG. 1 shows in schematic view the infrastructure of the messaging system according to the invention.

Preliminarily, it should be noted that hereinafter "message" 60 means the set of all elements, both textual, graphic (both static and animated) and/or audio and/or video, which are represented on the display screen so as to occupy a specific area ("view") of said screen. Preferably, said area is delimited by a frame 59, which is defined hereinafter as a "balloon", or can have a different graphic characterization (for example a color) with respect to the background (and the remaining areas) of said display screen. Conveniently, within the screen, each message 60—comprising the frame 59 with the textual, graphic and/or audio and/or video elements—is represented in a spaced or graphically disconnected manner with respect to the other chat messages.

In particular, a message 60 can comprise within its frame or balloon 59:
only text 39, or
only one or more graphic and/or audio elements 33, or
a combination of text 39 with one or more graphic and/or audio elements 33.

Conveniently, a message 60 can comprise, in addition to or as an alternative to the text 39, any digital element transferable via the internet. Conveniently, a message 60 may comprise, in addition to or as an alternative to the text 39, one or more multimedia elements which can be digitally represented and which can be exchanged by means of the messaging system 2 according to the invention, for example but not limited to: graphic elements, audio elements, video elements, text documents, biometric identifiers or other.

In particular, the graphic elements 33 comprise symbols, icons or images in general (both static and animated) to be inserted—with or between any text 39, or even without the latter—inside the balloon 59 of the message itself. Preferably, but not necessarily, these images 33 represent a concept, an emotion or a mood, substantially corresponding to the "emoji".

By "chat" 14 or "conversation" is meant the set of all messages 60 that are exchanged between two users (i.e. between a sending user and a recipient user) or between multiple users (in the so-called "group chats") and which are represented in an orderly manner (also temporally) within a dedicated page or window (also called "chat-room") which is represented in a corresponding display screen 57. Conveniently, when creating a chat 14, the corresponding dedicated page or window may also be free of messages.

By "sub-chat" 49 is meant a particular type of chat that depends/derives from another chat (hereinafter called "parent chat") and in which the users who participate are automatically all the users of the parent chat, or a subset of these. In particular, a user who does not participate in the parent chat cannot be present in a sub-chat. The sub-chat is displayed inside a dedicated page or window, and different from that of the parent chat, which is represented on a display screen. Suitably, when creating a sub-chat, the corresponding dedicated page or window can also be free of messages.

By "avatar" 48 we mean instead the graphic representation used by each user to identify himself when he communicates with other users, for example in a chat 14, or when he sends a message 60.

By "item" we mean one or more chat 14 and/or one or more sub-chats 49 and/or one or more messages 60 and/or one or more graphic elements and/or audio and/or media 33 and/or, in general, digital elements transferable via the internet.

By "action" is meant an input provided by a user that is correctly and univocally detectable by a computer system. Preferably, the action includes a single tap ("tap"), a double tap ("double tap"), a scroll ("swipe"), or other movements that can be interpreted by a device equipped with a touch screen. The action can also include a click (single or double) of the mouse optionally assisted or replaced by pressing one or more keys of the keyboard if the device is of a desktop type, or it can include the pronunciation of a sound or a sequence of sounds, for example of words, in the case in which the device has voice commands, or it can still include the framing of a facial expression or of a defined pattern ("QRcode", or barcode).

Conveniently, the messaging system according to the invention can comprise one or more of the characteristics provided in PCT/IB2018/055193, the content of which is intended hereinafter as directly and entirely incorporated by reference.

Suitably, the messaging system according to the invention can comprise one or more of the characteristics provided in PCT/IB2020/050173, the content of which is intended hereinafter as directly and entirely incorporated by reference.

As can be seen from the figures, the infrastructure of the messaging system according to the invention, indicated as a whole with the reference number 2, comprises at least one sending device 4 and at least one receiving device 6 which are provided with communication means for transmitting and receiving data with at least one central unit 8.

Preferably, the sending device 4 and/or the receiving device 6 can comprise a client consisting of a computer or a portable device, for example smartphone or tablet.

Preferably, the central unit 8 can comprise at least a computer 10, such as for example a real or virtual remote server and/or a cloud system.

The first and second devices 4, 6 are configured to send, via the central unit 8 with which both devices are communicating, the sending and receiving on the network, either via the Internet or locally, of messages 60 containing text 39 and/or graphic elements 33 and/or audio (for example multimedia content).

Conveniently, a first software module is loaded and/or executed in the first and second device 4, 6 while a second software module is executed in the central unit 8. Conveniently, in the case of a portable device such as a smartphone or tablet, the first software module consists of a native mobile software application, also known as an APP. Suitably, the first software module can also be in the form of a web application or a desktop application.

In particular, the first software module is configured to send messages 60 by making a request to the central unit 8 (server) on the basis of a communication protocol, preferably HTTPS. Advantageously, this request is made by the POST method so as to send the content of the messages (in particular in the form of a suitable data structure) to the central unit 8 without showing them in the search string (query-string), however this request could also be done using the GET method, thus passing the data in the search string.

Advantageously, the data transfer between the devices 4,6 and the central unit 8 takes place according to a traditional client-server architecture which uses, for example, the HTTP transfer/communication protocol (HyperText Transfer Protocol). Preferably, this transfer/communication protocol is made secure, i.e. it is of the HTTPS type for example, using an encrypted connection, for example according to the TLS (Transport Layer Security) or SSL (Secure Sockets Layer) cryptographic protocols.

The first software module loaded and executed in the recipient device 6 is configured to download from the central unit 8 the message 60 (in the form of a structured data packet) which has been sent by the sending device 4 and is prepared by said central unit 8. Preferably, the download from the central unit 8 of the message 60 by the recipient device 6, or in any case the transmission of the message 60 from the central unit 8 to the recipient device 6, is carried out using a REST (REpresentational State Transfer) or GraphQL architecture used preferably, but not necessarily, on HTTPS protocol or alternatively MQTT over WebSocket.

Advantageously, the first software module loaded and executed in the recipient device 6 can be configured to periodically access, according to a predefined frequency, to the central unit 8 to query it for the possible presence/availability of one or more messages 60 intended for it—therefore following a client-server dialogue mode called "polling"- and, if so, downloads this message 60 from the central unit 8.

Preferably, as shown in FIG. 1, the system 2 according to the invention can also comprise a notification platform 50, such as Google Cloud Messaging or Apple Push Notification Service or Firebase Cloud Messaging, which acts as a mediator between devices 4, 6 and central unit 8 and which is configured to notify said devices, asynchronously, when new data are available for them in the control unit, therefore following a method called "push notification". In particular, for this purpose, the second software module is also configured so that, on the basis of the message 60 sent by the sending device 4, it sends a notice 52 to the notifying platform 50, which is then configured to forward this warning to the corresponding recipient device 6. Suitably, the notice 52 which the central unit 8 sends to the notifying platform 50 comprises an identification code of the central unit 8 which sends the notice, the identification code of the recipient device 6 to which the notice must be sent and the content of this notice 52.

Preferably, the first software module loaded in the sending 4 and/or receiving 6 devices is configured to have a first active state, in which a bidirectional connection is established and maintained with the central unit 8, and a second state rest, in which the sending 4 and/or receiving 6 device are not connected with the central unit 8. Advantageously, the first software module is also configured so that, when it is in said first active state, the recipient device 6 interrogate the central unit 8 not periodically (i.e. according to the "polling" mode), but only when it receives a notice, preferably through the notifying platform 50 and according to the method called "push notification". Suitably, correspondingly, when new data destined to a certain recipient device 6 in which the first software module is in an active state are available in the central unit 8, the second software module is configured so as to send to said recipient device 6 a warning to interrogate the central unit 8. In doing so, the central unit 8 is interrogated only when there is new data to be downloaded, thus avoiding to interrogate it periodically and unnecessarily; this is particularly advantageous in that it allows to decrease the data traffic and above all to avoid unnecessarily consuming the data transmission band.

Preferably, the data of the messages 60 which are exchanged, within the messaging system 2, between the sending device 4 and the receiving device 6 are encrypted by means of an end-to-end encryption system.

The Central Database 12

In the central unit 8 at least one database 12 is loaded (or associated) which, appropriately, defines the centralized database which contains in an aggregate and organized way the data of all users of the messaging system 2 and of all the items (chat, messages, graphic and/or audio elements) that can be created, managed and exchanged by said users within the same messaging system 2.

The database 12 is conveniently provided, in the traditional way, with supports for storing data and with a processor for the processing of the former (database server), and of software applications (i.e. a database management system) for the creation, manipulation, management and efficient query of the data stored in the media.

Figure 2:
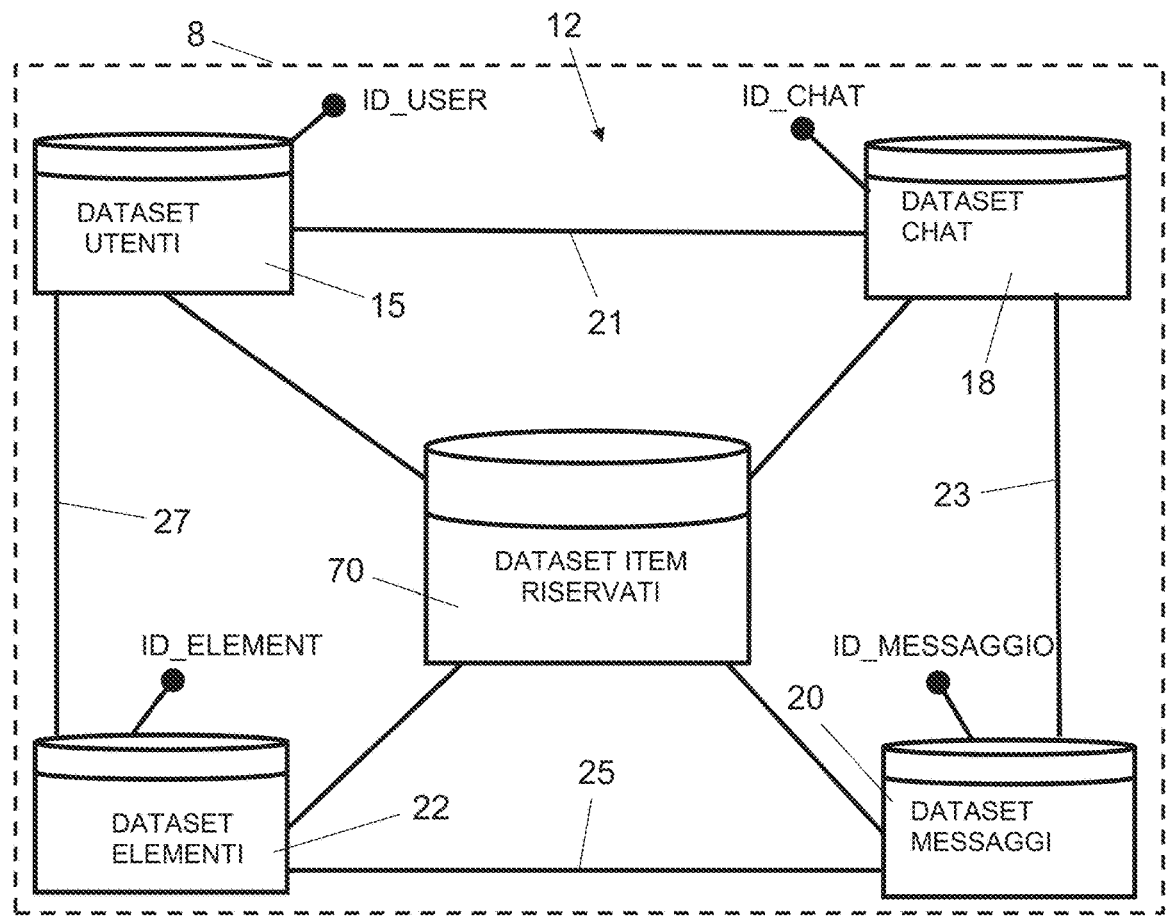
FIG. 2 shows in schematic view the centralized database on which is based the infrastructure of the messaging system according to the invention.
Figure 3:
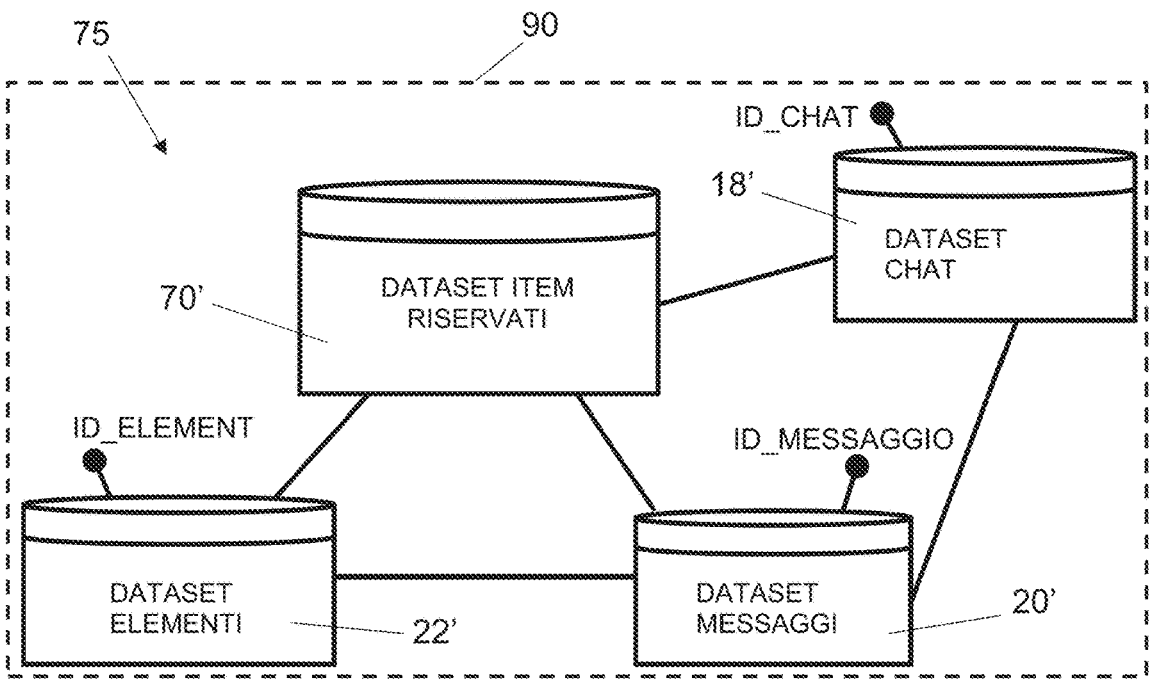
FIG. 3 shows in schematic view the local subset which is downloaded locally on a device managed by a given user and which derives from the centralized database of FIG. 2.
Figure 4:
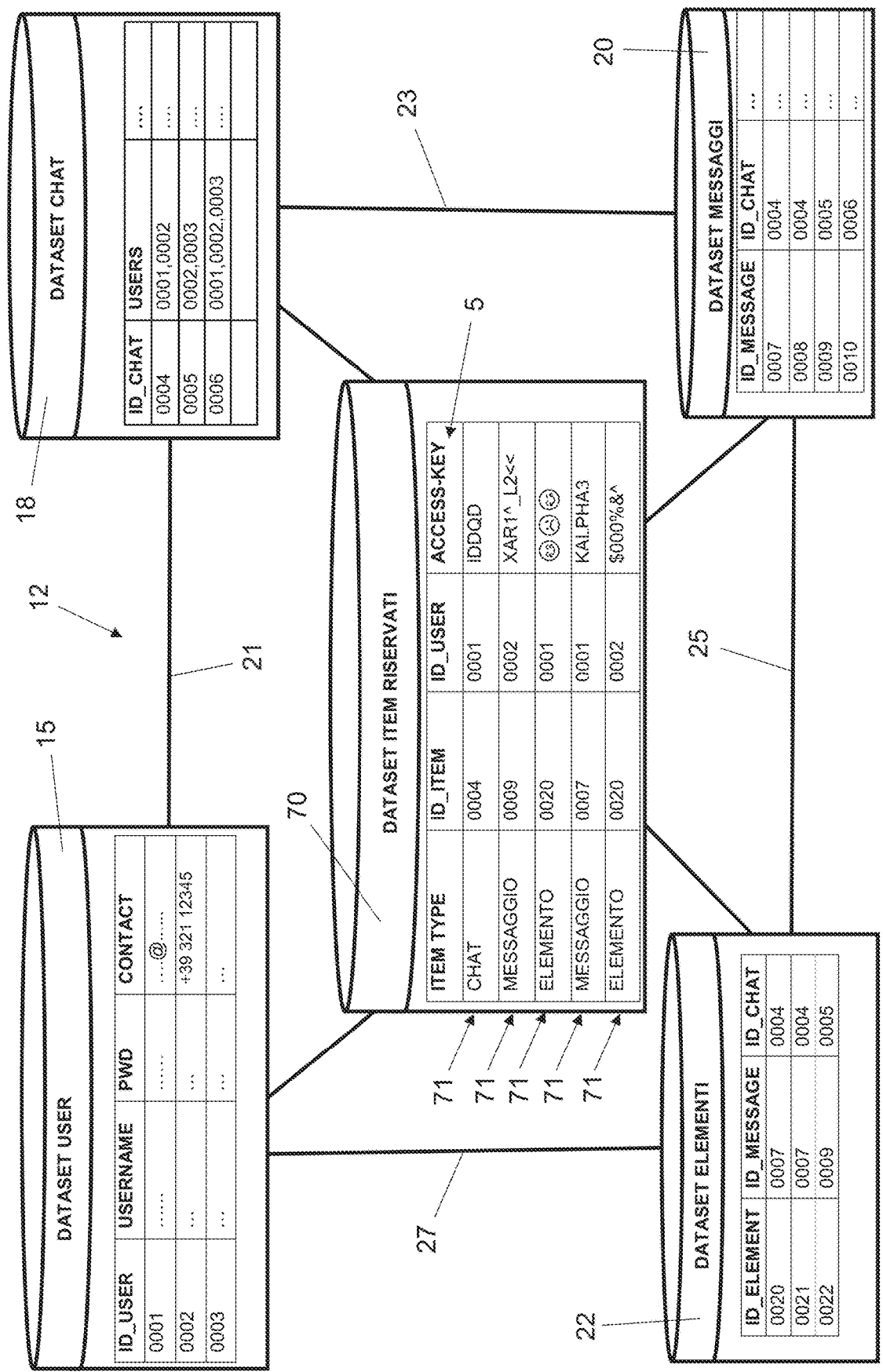
FIG. 4 shows in schematic view an example of the centralized database of FIG. 2.

Suitably, as represented in FIG. 2, the database 12 comprises:
- a user dataset 15 containing the data of each user of the messaging system according to the invention;
- a chat dataset 18 which contains the data of all the chats 14 of all users of the messaging system,
- a message dataset 20 which contains the data of all the messages 60 of all the chats 14 of the messaging system,
- one or more elements dataset 22 containing at least the unique identification codes (ID_ELEMENT) of all the graphic elements 33 (both static and animated) and/or audio and/or video manageable through the messaging system 2; in particular, in the case of a graphic element, this dataset contains, for each graphic element, at least the unique identification code (ID_ELEMENT) of the same which, preferably, defines the primary key of this dataset.

Conveniently, the user dataset 15 contains a unique identification code (ID_USER) of the user who preferably defines the primary key of this dataset.

Preferably, the user dataset 15 contains the unique ID code of the user, a username and password and, preferably, also the name and surname, a reference to be contacted (for example, the e-mail address) and other traditional registration data.

Suitably, the chat dataset 18 contains a unique identification code (ID_CHAT) of each chat 14 which, preferably, defines the primary key of this dataset.

Suitably, the message dataset 20 contains a unique identification code ID (MESSAGE_ID) of each message 60 which, preferably, defines the primary key of this dataset.

Preferably, the elements dataset 22 contains, in addition to the unique identification code (ID_ELEMENT) of the graphic and/or audio element 33, an address/location (for example a web URL) of a further database, also in the cloud—and preferably the precise address or location of the corresponding record within this further database—in which the data defining the actual graphic and/or audio element 33 are stored in an organized way. Advantageously, according to a preferred embodiment, in the elements dataset 22 of the central database 12, the unique identification code (ID_ELEMENT) of the graphic and/or audio element 33 corresponds to the univocal address/location (preferably web) which identifies the record within the further database 47 (also in cloud) where the data defining the actual element 33 are stored.

Conveniently, the database 12 is configured and structured so that the user dataset 15 and the chat dataset 18 are as associated with each other by means of a first relationship 21 (which basically constitutes another dataset) to connect to the data of each chat of the dataset 18 the data of two (or more) users of the dataset 15 participating in it.

Suitably, the database 12 is configured and structured so that the chat dataset 18 and the message dataset 20 are associated with each other by means of a second relationship 23 (which substantially constitutes another dataset) to connect to the data of each message 60 of the message dataset 20 the chat 14 data of the chat dataset 18 in which they were exchanged.

Suitably, the database 12 is configured and structured so that the message dataset 20 and the elements dataset 22 are associated by means of a third relationship 25 (which substantially constitutes a further dataset) to connect the data of each message 60 of the message dataset 20 to the data of the elements 33 which are contained in said message.

Suitably, the database 12 is configured and structured so that the user dataset 15 and the elements dataset 22 are associated by means of a fourth relationship 27 (which basically constitutes another dataset) to connect the data of each user or of the user dataset 15 of the elements 33 of the elements dataset 22 to which each user has access and/or which are manageable/usable by each user. Conveniently, in said messaging system 2 each element 33 manageable within the messaging system 2 is provided and associated with said unique identification code ID_ELEMENT.

Suitably, the messaging system 2 is configured so that each item (i.e. each chat 14 or message 60 or element 33) created and exchanged—or in general present—within the messaging system 2, can be of two types:
- a first type, hereinafter defined as "open" (i.e. with open and free access/display), in which the corresponding item is always visible on the device display and this without requiring any unlocking procedure (preferably by prior recognition and/or by entering any access key), or
- a second type, hereinafter defined as "reserved" (i.e. with reserved and "secret" access/display), in which the display of the corresponding item on the device display is instead subject to an unlocking procedure (preferably by prior recognition and/or by correctly entering a specific access key).

In addition, messaging system 2 is configured so that each item of the second "reserved" type can assume two states:
- a first state, hereinafter called "hidden", in which said item is not shown on the device display, or
- a second state, hereinafter defined as "visible", in which said item is displayed (entirely and/or in a preview) on a screen implemented on the device display.

In particular, when said item of the second "reserved" type is in the visible state, the item itself is displayed—entirely and/or in a preview—in a corresponding screen, which is implemented on the display of the device 4 and/or 6, occupying a specific area/surface of said screen (see FIGS. 9b, 10b, 11b and 12b). When said item is in the "hidden" state, it is not displayed inside the corresponding screen implemented on the display of device 4 and/or 6 and also does not occupy said specific area/surface of said screen which is occupied when it is in the visible state, thus avoiding being aware of its presence/existence (see FIGS. 9a, 10a, 11a and 12a). More in detail, when said item of the second "reserved" type is in the "hidden" state, the corresponding display area which—following the unlocking procedure—should be occupied by said item, is in no way implemented on the display and/or is occupied by other (previous or subsequent) items of the first type.

Conveniently, in essence, when a chat 14 is in the first "hidden" state, in screen 42 containing the summary list of the various chats of a user, the relative portion of the chat preview containment screen is not even displayed and implemented itself (see FIG. 9b); when a message 60 is in the first "hidden" state, inside the screen 57 of the corresponding chat, the relative frame 59 for containing the content of said message is not even displayed nor implemented (see FIG. 10b); when a graphic and/or audio element 33 is in the first "hidden" state, the space that—inside the message 60 (see FIG. 11b) or the keyboard 35 (see FIG. 12b)—is occupied by said graphic and/or audio element is not even displayed or is occupied by the surrounding text or graphic and/or audio elements of the first open type. Suitably, therefore, when an item (chat, message or graphic and/or audio element 33) of the second "reserved" type is in the first "hidden" state, there is no feedback or visual indication on the display that allows to notice the existence/presence of the hidden item within the messaging system.

Furthermore, the messaging system is suitably configured so that the unlocking procedure—to pass the items of the second "reserved" type from the first hidden state to the second visible state—is configured so that, for each unsuccessful attempt, no visual feedback is provided regarding the failure/failure of this attempt and, preferably, the screen remains the same. This is particularly advantageous in that a third user who takes possession of the device would not even notice the existence of reserved items of the second type; in fact, even after a fortuitous or voluntary attempt to unlock (for example by attempting to enter a password) with an incorrect result, the display screen remains the same and the third party does not receive any visual feedback (i.e. there is no message of the "Wrong password" type), and therefore the latter does not notice whether or not "reserved" items of the second type are present.

Suitably, the first software module and/or the second software module are configured so that, within the messaging system 2, are created and exchanged:
- item of a first open type comprising at least one chat 14 and/or message 60 and/or digital element 33 which is always visible within the corresponding screen implemented on the display of the device 4 and/or 6, and
- item of a second type comprising at least one reserved chat 14 and/or message 60 and/or digital element 33 that passes between:
  - a first hidden state in which said at least one chat 14 and/or message 60 and/or digital element 33 is in no way implemented and displayed within the corresponding screen implemented on the display of the device 4 and/or 6, thus not occupying any display area,
  - a second visible state in which said at least one chat 14 and/or message 60 and/or digital element 33, entirely and/or in a preview thereof, is implemented and displayed on the corresponding screen implemented on the display of the device 4 and/or 6, thus occupying an area of the display.

Advantageously, for this purpose, the database 12 comprises a reserved item dataset 70 which is related to the user dataset 15, the chat dataset 18, the message dataset 20 and the elements dataset 22.

Preferably, each item of the second "reserved" type is by default in the first hidden state.

Preferably, each item of the second "reserved" type passes from the hidden state to the visible state following an unlocking procedure carried out on/by means of the device 4, 6 on whose display said items are intended to be viewed.

Preferably, each item of the second "reserved" type switches from the visible state to the hidden state automatically after a predefined time and/or when the user performs a certain action on said device 4 and/or 6.

Preferably, in the messaging system according to the invention, each item of the second "reserved" type is not always and automatically downloaded from the server, but is advantageously downloaded only if the unlocking procedure has been carried out successfully (i.e. with a positive outcome). This is advantageous both in terms of saving on data consumption and in terms of confidentiality of the management of the items, which are downloaded locally from the central unit 8 to the device 4 and/or 6 only following prior authorization. In particular, the reserved item dataset 70 is configured so that each record 71 of this dataset includes at least the following three fields:
- the unique identification code ID_ITEM of an item of the chat dataset 18, of the message dataset 20 or of the elements dataset 22; in particular, the unique identification code ID_ITEM can be that of a chat 14 or of a message 60 or of an element 33,
- the unique identification code ID_USER of a user of the user dataset 15; in particular, for a specific chat 14 or message 60, this identification code corresponds to that of the user who participates in said chat or who is the sender/recipient of the message; while, for the elements 33, this identification code corresponds to that of the user who has access and/or who is enabled to manage/use said element,
- a code that identifies the access key (ACCESS_KEY) 5 to be entered/typed in order to be able to view the corresponding item on the display of/associated with the device 4, 6.

In essence, the reserved item dataset 70 is in relation with the user dataset 15, with the chat dataset 18 with the message dataset 20 and with the elements dataset 22 to be thus populated with the unique identification code ID_USER of a user of the user dataset 15 and with the unique identification code ID_CHAT of the chat dataset 18 or ID_MESSAGE of the message dataset 20 or ID_ELEMENT of the elements dataset 22, which is then combined with a code defining the access key 5 to display the corresponding chat 18, message 60 or element 33.

Suitably, the primary key of each record 71 of the reserved item dataset 70 may be defined by a field ("Item Type") relating to the type of item, the unique identifier code ID_ITEM of the corresponding item (derived from the chat dataset 18 or messages dataset 20 or elements dataset 22) and the user's unique ID_USER identification code (derived from the user dataset 15).

Alternatively, all the items (chat 14, messages 60 and elements 33) of the messaging system 2 according to the invention, regardless of their type, are uniquely identified within the database 12 by means of a unique identification code (i.e. the ID_CHAT codes, ID_MESSAGE and ID_ELEMENT are unique not only within the single dataset, but also among all datasets 18, 20 and 22). In particular, this means that, within the database 12, each chat of the chat dataset 18 of the messaging system 2 has its own unique identification code ID_CHAT which, therefore, is certainly distinct and different not only from that of the other chats of the chat dataset 18, but also from that of the ID_MESSAGE of the individual messages present in the message dataset 20 and of the ID_ELEMENT of the individual elements of the elements dataset 22. Therefore, appropriately, the primary key of each record of the reserved dataset item 70 can be defined only by said primary key ID_CHAT, ID_MESSAGE and ID_ELEMENT used respectively in the chat dataset 18, in the message dataset 20 and in the elements dataset 22.

Conveniently, if a certain item of a certain user is present within the reserved item dataset 70, then—only for that specific user—this item is of the reserved type; on the contrary, if a specific item of a specific user is not present in the reserved item dataset 70, then—only for that specific user—this item is of the open type.

More in detail, the chat dataset 18 contains the data of all the chats 14 exchanged in/through the messaging system 2 (both of the open and reserved type), the message dataset 20 contains the data of all the messages exchanged in/through the messaging system 2 (both of the open and reserved type), the elements dataset 22 contains the data of all the elements exchanged in/through the messaging system 2 (both of the open and reserved type).

The reserved dataset item 70 contains the identification data only of the chats 14 or of the messages 20 or of the elements 33 of the reserved type. More in detail, this means that the identification data only of the chat 14 or of the messages 20 or of the elements 33 of the open type will not have a corresponding record 71 in the reserved dataset item 70. In essence, therefore, not all the identification codes of the chat 14 or of the messages 20 or of the elements 33 of the respective datasets 18, 20 and 22 are recalled and present in the reserved item dataset 70.

Conveniently, within the messaging system 2, each item of the reserved type (and therefore having a corresponding record 71 in the reserved item dataset 70) is by default in the "hidden" state and temporarily switches to the "visible" state only after the prior and correct insertion of a code corresponding to the access key 5 to which each item is associated in the reserved item dataset 70.

On the contrary, each item of the open type (and therefore without a corresponding record 71 in the reserved item dataset 70) always has and only the "visible" state, i.e. said item (in its entirety and/or one in its preview) is always viewable on a screen implemented on the device display.

The Chat Dataset 18

Advantageously, the database 12 is configured and structured so that each chat 14 created in/that takes place in the messaging system 2 is provided and/or associated with the following fields:
- said unique identifier ID_CHAT of the chat; in particular, this code defines the primary key of the chat dataset 18,
- the unique identification codes of the users participating in the chat;
- a code that identifies a shared access key (ACCESS_KEY_CHAT) 80, which is the same (i.e. it is common) and shared between the participants of the chat, to be entered/typed in order to allow each chat participant to view the corresponding chat on the display of the corresponding device associated with it.

Conveniently, within the messaging system 2, each chat 14 can be of two types:
- an open type 14' to all participating users in which the corresponding chat is always visible on the display of all the devices managed by the users participating in the chat and this without requiring any prior recognition and/or insertion of any access key, or
- a reserved type 14" for all participating users in which the display of the corresponding chat on the display of the devices managed by all users participating in the chat is instead subject to the correct insertion of that specific shared access key 80.

In particular, if the ACCESS_KEY_CHAT field is not given value (i.e. it is empty) or is given value according to a predefined default value, chat 14 is of the open type 14' for all participating users; on the contrary, if the ACCESS_KEY_CHAT field is given value with a specific shared access key 80 (for example in the form of a string), the chat 14 is of the type reserved 14" for all participating users.

Furthermore, within the messaging system 2, each chat 14 of the reserved type 14" can assume two states:
- a "visible" state in which the entire chat and/or a preview of it is displayed on a screen implemented on the device display, or
- a "hidden" state where chat is not shown on the device display.

Conveniently, within the messaging system 2, each chat 14 of the reserved 14" type (and therefore having the ACCESS_KEY_CHAT field which is given value with a certain shared access key 80) is by default in the "hidden" state and passes temporarily in the "visible" state only following the prior and correct insertion, by a user participating in said chat, of a code corresponding to the shared access key 80.

On the contrary, each chat 14 of the "open" type 14' always has only the "visible" status, i.e. the entire chat and/or a preview of it is always displayed on a screen implemented on the device display.

Advantageously, each chat 14 can comprise a field relating to the unique identification code of the user who created the chat and/or a field relating to the date of creation of the chat.

The Messages 20 dataset Advantageously, the database 12 is configured and structured so that each message 60 created/exchanged within the messaging system 2 is provided and/or associated with the following fields:
- said unique identification code (ID_MESSAGE) of message 60; preferably, this code defines the primary key of the message dataset 20,
- an identification code of the chat 14 to which the message 60 belongs; in particular, this code is defined by the primary ID_CHAT key of the chat dataset 18,
- a unique identification code of the user who sent the message,
- a unique identification code of the user or users who received the message,
- a code that identifies the shared access key 80 (ACCESS_KEY_MESSAGE) to be entered/typed in order to be able to view a specific message 60 in a chat that is displayed on a screen implemented on the display of or associated with a device.

Conveniently, within the messaging system 2, each message 60 can be of two types:
- an open type 60' in which, for all participants in a specific chat 14, the corresponding message 60 is always visible within said chat 14 and this without requiring any prior recognition and/or insertion of a shared access key 80, or
- a reserved type 60" in which, for all participants in a specific chat 14, the display of the message within said chat 14 to which it belongs is subject to the correct insertion of that specific shared access key 80.

In particular, if the ACCESS_KEY_MESSAGE field is not given value (i.e. it is empty) or is given value according to a predefined default value, the message 60 is of the open type 60' for both the sending user and the recipient(s); on the contrary, if the ACCESS_KEY_MESSAGE field is given value with a specific shared access key 80 (for example in the form of a string), the message 60 is of the reserved type 60" for both the sending user and the recipient(s).

Furthermore, within the messaging system 2, each message 60 of the reserved type 60" can assume two states:
- a "visible" state in which the entire message and/or a preview of it is displayed on a screen implemented on the device display, or
- a "hidden" state in which the message is not shown on the device display.

Conveniently, within the messaging system 2, each message 60 of the reserved type 60" (and having the field ACCESS_KEY_MESSAGE given value with a certain shared access key 80) is by default in the "hidden" state and temporarily switches to the state "Visible" only following the prior and correct insertion of a code corresponding to the shared access key 80.

On the contrary, each message 60 of the open type 60' always and only has the "visible" status, i.e. its content and/or a preview of it can always be viewed on a screen implemented on the device display.

Advantageously, each message 60 may also be associated with one or more of the following fields:
- the date the message was created,
- the date on which the ACCESS_KEY_MESSAGE field relating to the shared access key 80 was populated; appropriately, in this way the date is kept on which the display of a specific message in a chat has become subordinated to the correct prior insertion of a specific shared access key 80 (i.e. when a message 60 has become of the reserved type).

The Elements Dataset 22

Advantageously, the database 12 is configured and structured so that each graphic and/or audio element 33, which has been inserted inside a message 60 created/exchanged within the messaging system 2, is provided and/or associated with the following fields:
- said unique identification code (ID_ELEMENT) of the graphic and/or audio and/or media element 33 in general; preferably, this code defines the primary key of the elements dataset 22,
- a unique identification code of message 60 in which said graphic and/or audio element 33 is inserted; in particular, this code is defined by the primary key of the message dataset 20,
- a code that identifies the shared access key 80 (ACCESS_KEY_ELEMENT) to be inserted/typed in order to be able to view a specific graphic and/or audio element within the message 60 that is displayed, within the corresponding chat to which it belongs, on a screen implemented on the display of the/associated with a device of the sending and/or recipient user.

Suitably, within the messaging system 2, each element can be of two types:
- an open type 33' in which, for all users of a given message 60, the corresponding element 33 is always visible within said message 60 to which it belongs and this without requiring any prior recognition and/or insertion of a shared key access 80, or
- a reserved type 33" in which, for all users of a specific message 60, the display of the element 33 within the message 60 to which it belongs, is subject to the correct insertion of that specific shared access key 80.

In in particular, if the "ACCESS_KEY_ELEMENT" field is not given value (i.e. it is empty) or is set according to a predefined default value, element 33 is of the open type 33' for all users (both sender and recipient/s); on the contrary, if the "ACCESS_KEY_ELEMENT" field is given value with a specific shared access key 80 (for example in the form of a string), element 33 is of the reserved type 33" for all users (both sender and recipient(s)).

Furthermore, within the messaging system 2, each element 33 of the reserved type 33" can assume two states:
- a "visible" state in which said element, in its entirety and/or in a preview, is displayed on a screen implemented on the device display, or
- a "hidden" state in which said element 33 is not shown on the device display.

Conveniently, within the messaging system 2, each element 33 of the reserved type 33" (and having the "ACCESS_KEY_ELEMENT" field given value with a specific shared access key 80) is by default in the "hidden" state and temporarily passes in the "visible" state only following the prior and correct insertion of a code corresponding to the shared access key 80.

On the contrary, each element 33 of the open type 33' always has only the "visible" state, i.e. its content and/or a preview of it can always be viewed on a screen implemented on the display of the device.

Advantageously, to each graphic and/or audio element 33, which is inserted inside a message 60 created/exchanged within the messaging system 2, one or more of the following fields may also be associated:

- the unique identification code of the user who populated the "ACCESS_KEY_ELEMENT" field relating to the shared access key 80; opportunely, in this way it is kept track of who made the visualization of a certain element 33 inside a message 60 subordinated to the correct preventive insertion of a determined key 5.
- the type of a specific element; for example, it can concern a graphic element (for example an Emoji® or an avatar) or audio or video,
- the date on which the ACCESS_KEY_ELEMENT field relating to the shared access key 80 was populated; suitably, in this way the date is kept on which the display of a specific element 33 within a message 60 has become subordinated to the correct prior insertion of a specific shared access key 80.

Software Modules

Inside the sending 4 and/or recipient 6 device the first software module is loaded and/or executed.

The second software module configured to manage communications with the sending 4 and receiving 6 devices, and consequently the sending and receiving of messages and notifications, is conveniently loaded and/or executed inside the central unit 8.

In the following, "item" means one or more chat 14 and/or one or more messages 60 and/or one or more graphic and/or audio elements 33. In particular, "item" also means, as better clarified later, even a sub-chat.

Creation of Items of a Type Reserved Only for a Specific User (See FIG. 9)

Suitably, when executed in a device, the first software module is configured to create—within database 12—a new record 71 of the reserved dataset item 70 in which one or more items connected to the user who logged in to the messaging system 2 is associated with an individual access key 5, thus making said items of the type reserved for that user.

In particular, the first software module is configured to create a new record 71 of the reserved item dataset 70 containing:

- the ID_ITEM identification code of a specific item,
- the ID_USER identification code of the user who has logged in to the messaging system 2 and who is connected to said item,
- the access key ACCESS_KEY 5 that the user who has logged in to the messaging system 2 wishes to associate with that particular item.

Suitably, the ID_ITEM identification code of a given item can include:

- the ID_CHAT identification code of a chat 14 in which the user who has logged in to the messaging system 2 participates, or
- the ID_MESSAGE identification code of a message 20 sent/received by the user who has logged in to the messaging system 2, or
- the ID_ELEMENT identification code of an element 33 used within a message by the user who has logged in to the messaging system 2.

Conveniently, in this way, a specific item becomes of the type reserved only for that user having—in the reserved item dataset 70—the corresponding ID_USER identification code associated with the ID_ITEM identification code of that particular item.

In substance, it can happen for example that a certain message has been made of the reserved type for the sending user (i.e. in the reserved dataset item 70 there is a corresponding record 71 in which the ID_MESSAGE identification code of the message is combined with the ID_USER identification code of the sender user and a KEY_ACCESS access key), while for the recipient user it remains of the open type (i.e. in the reserved dataset item 70 there is no corresponding record in which the ID_MESSAGE identification code of the aforementioned message is combined with the ID_USER identification code recipient user).

Display of Items of a Type Reserved for a Specific User (See FIG. 10)

Suitably, when executed in a device, the first software module is configured so that the items that—for that particular user who has logged in to the messaging system 2—are of the reserved type (that is they have a corresponding record in the reserved dataset item 70) temporarily change from the "hidden" state to the "visible" state following the preventive and correct insertion of an ACCESS_KEY code corresponding to the access key 5 which, within the corresponding record 71 of the reserved item dataset 70, is associated with the ID_ITEM identification code of said item and the ID_USER identification code of said user who logged in to the messaging system 2.

Conveniently, the first software module running in the device is configured to perform a display unlock procedure that is configured to pass the items that for a given user are of the type reserved from the "hidden" state to the "visible" state. Preferably, this procedure includes the following operations:

- receiving the access code that is entered by the user by acting on the device in which the first software module is executed, preferably by acting on the keyboard 35 provided in the device or displayed on the touch-screen display of the device,
- checking whether, within the reserved item dataset 70, there is an item (i.e. a chat 14 and/or a message 60 and/or a graphic and/or audio element 33) whose access key ACCESS_KEY code 5 corresponds to the code entered by the user and in which, in addition, the user's unique ID_USER identification code corresponds to the code of the user who logged in to the messaging system,
- only in case of a positive outcome of the verification, it displays on the device display the corresponding item or items (completely and/or by means of a preview, even partial) that are associated with that user who has logged in and who have the access key 5 given value with the same code entered by the user; on the contrary, in the event of a negative outcome of the verification, the corresponding item or items are not shown on the device display.

Advantageously, the items of the reserved type—which by default have the "hidden" state and which, following the unlocking procedure, pass to the "visible" state—maintain this "visible" state only temporarily (for a predefined time and/or until the user performs a certain action on the device and/or until a certain event occurs) and then return to the "hidden" state until a further procedure for unlocking the display is performed.

Suitably, the first software module executed in the device is configured to temporarily display on the display of the device the items that are of the type reserved for a specific user (i.e. those that have a corresponding record 71 in the reserved item dataset 70).

Advantageously, the first software module executed in the device is configured to automatically interrupt the display, from the device display, of said items of the reserved type (and thus make them switch from the "visible state" to the "hidden" state) after a predefined interval of time has elapsed, which preferably can be set by the user.

Advantageously, the first software module executed in the device is configured to automatically interrupt the display, from the device display, of said items of the reserved type (and thus to pass them from the "visible state" to the "hidden" state) following a particular action that the user performs on the device (for example a double "tap" on a certain area of the touch-screen and/or a long press of a certain key). Preferably, the first software module executed in the device is configured to automatically interrupt the display, from the device display, of said items of the reserved type (and thus to pass them from the "visible state" to the "hidden" state) following an activated event by one or more of the following actions:

action (for example by "tap") on a dedicated button that is displayed on a screen implemented on the touch-screen display of the device, action to close or pass in the background the dedicated messaging system application, action to lock the screen of the device, action to put the device into stand-by status or to turn it off, action to start a new chat 14 within the messaging system, action to return to a previous screen or to change the displayed screen.

Local Personal Subset

Advantageously, each device that acts as a sender and/or receiver within the messaging system 2 comprises a local memory 90 in which to download and store a personal subset 75 which is derived from the central database 12 of the central unit 8 and which contains all the data of the items (chat 14, messages 60 and/or elements 33) of a specific user who has logged in to the messaging system 2 using that specific device.

Conveniently, the local memory 90 is a mass memory or primary memory or RAM memory or it can also be of the cache type.

Suitably, the personal subset 75 is generated from the central database 12 and is downloaded and stored in the local memory 90 of a corresponding device managed by a user who has logged in to the messaging system 2 with that device.

Conveniently, the personal subset 75 has a structure substantially corresponding to that of the central database 12 but without the user dataset 15. In particular, the personal subset 75 comprises a chat dataset 18', a message dataset 20', an elements dataset 22' and a reserved item 70' dataset, however, each of these datasets contains only the corresponding items connected to a user who, in particular, is the user who has logged in to the messaging system 2 with/on that particular device.

Advantageously, according to the invention, the first software module executed in the sending and/or recipient device and the second software module loaded in the central unit 8 are configured so that, following the first log-in and/or each access to the messaging system 2 on a given device:

the first software module of the sending 4 and receiving 6 device sends to the central unit 8 the data (username and password) that the user enters, acting on his device 4 and/or 6, when he logs in to the messaging system 2, the second software module of the central unit 8 verifies the log-in data thus received (i.e. it checks—preferably by querying the user dataset 15 of the central database 12—if together they correspond to a user already registered to the messaging system), extracts the ID_USER identification code of the corresponding user and, using the code thus extracted, identifies—always within the central database 12—all the items in the reserved item dataset 70 and, preferably, also in the chat dataset 18, in the message dataset 20 and in the elements dataset 22 which are associated, through a relationship, with the ID_USER identification code of that user, the first software module of the sending 4 and/or receiver 6 device thus downloads to the local memory 90 of the device 4 and/or 6 the items thus identified which, appropriately, thus define the personal subset 75.

Conveniently, in this case, when the items of the reserved type, which by default have the "hidden" status, are downloaded to the local memory 90 of the device 4 and/or 6 (thus creating locally the personal subset 75 of the reserved item dataset 70) still have the "hidden" status and they pass to the "visible" state only following a procedure for unlocking the display in which, preferably, the verification phase is carried out within said personal subset 75 present in the local memory 90. Conveniently, in this way, a higher speed for data access and for this verification phase is obtained.

Alternatively, when items of the reserved type, which by default have the "hidden" status, are not downloaded to the local memory 90 of the device, the verification phase of the unlocking procedure is carried out within the reserved item dataset 70 present in the database 12 which is loaded into the central unit 8. Conveniently, in this way, greater data security is guaranteed.

Conveniently, the synchronization step between the database 12 of the central unit 8 and the personal subset 75 in the local memory 90 of the device is carried out at each access and/or log-in that the user carries out to the messaging system 2 through the devices 4 and/or 6. Advantageously, moreover, the central unit 8 can send to each device 4 and/or 6 the items managed and/or exchanged within the messaging system 2 as soon as they become available on the central unit, preferably notifying it via the Push notification system.

Suitably, the first software module and the second software module are configured so that each new record 71 relating to an item of the reserved type is automatically added both in the reserved dataset items 70 of the database 12 provided in the central unit 8 and in the reserved dataset items 70' of the personal subset 75 provided in the local memory 90 of the sending and/or receiving device.

Advantageously, the first software module and the second software module are configured so that each new record—which can be related to an item of the open or reserved type—is automatically added:

in the chat dataset 18, in the message dataset 20 and/or in the elements dataset 22 of the database 12 provided in the central unit 8, and also in the chat dataset 18', in the message dataset 20' and/or in the elements dataset 22' of the personal subset 75 provided in the local memory 90 of the sending and/or recipient device.

Suitably, the first software module and the second software module are configured so as to search for items of the open type and of the reserved type, to be displayed on a corresponding screen of the device, only in the personal subset 75 provided in the local memory 90 of said device.

Suitably, the first software module and the second software module are configured in such a way as to search for items of the open type and of the reserved type, to then be displayed on a corresponding screen of the device, both in the personal subset 75 provided in the local memory 90 of the device and in the central database 12 provided in the central unit 8, and preferably first in the personal subset 75 and then in the central database 12.

Sub-Chat

Advantageously, the above also applies to a sub-chat 49 which is basically another chat which:
is of the reserved type, and
it derives from a main chat (hereafter called "parent chat") and, in particular, it is substantially parallel to the latter.

Suitably, the sub-chat 49 is configured so that the participants in it are all or a subgroup of the participants in the parent chat.

Conveniently, therefore, the sub-chat 49 comprises a series of messages exchanged in sequence between a sender and at least one recipient (in particular more recipients in the case of group chat) which also participate in the parent chat. Conveniently, each sub-chat can have a number of participants equal to or less than the number of participants of the parent chat and, in particular, the set of participants in a sub-chat can be a subset of the participants of the parent chat.

Advantageously, therefore, only users of a parent chat can be part of a sub-chat deriving from said parent chat and, appropriately, access to the sub-chat can be carried out using a key associated with said sub-chat. Furthermore, participants in a sub-chat will only be aware of the existence of the same sub-chat once a user of the parent chat has created said sub-chat, and has appropriately shared this information with other users of the parent chat, that he selected.

Suitably, the display/implementation of a sub-chat 49 can take place on a further dedicated screen which is different from that of the parent chat 14 to which the messages belong; advantageously, this further screen is implemented automatically once the shared access key 80 has been correctly inserted and can occupy the entire display of the device (thus completely covering the previous screens) or part of it (preferably so that parent chat 14 remains in the background).

Advantageously, for the management of the sub-chats, the database 12 is configured and structured so that the dataset chat 18 is provided with an additional PARENT_CHAT field which can:
not be given value (i.e. it is empty "null"), or be given value according to a predefined default value, and this means that the corresponding chat 14 of record 76 is a parent chat and does not depend on or derive from other chats (i.e. it is not a sub-chat),
be given value with the unique identification code of a specific chat 14, and this means that the corresponding chat of record 76 is a sub-chat 49 which depends/derives from the parent chat 14, Suitably, moreover, in the chat dataset 18 the records 76 which have given value the PARENT_CHAT field with the unique identification code of a given chat 14 have also given value the ACCESS_KEY_CHAT field with a code that identifies a shared access key 80 to allow the participants of the sub-chat 49 (whose identification codes are given value in the USERS field of the chat dataset 18) to switch the same sub-chat from the hidden state to the visible state. Conveniently, in this way, a sub-chat 49 is always and only of the reserved type.

Basically, if a certain record 76 of the chat dataset 18 has given value (not with a default value) both the PARENT_CHAT and ACCESS_KEY_CHAT fields, then the corresponding chat is a sub-chat 49; on the contrary, if in a given record 76 of the chat dataset 18, the PARENT_CHAT and ACCESS_KEY_CHAT fields are not given value (or they are given value with a default value), then the corresponding chat is a parent chat 14 of a sub-chat or it is a simple chat that is free of sub-chat.

Furthermore, the chat dataset 18 is configured so that the USERS field of a sub-chat 49 includes all or part of the unique identification codes of the users participating in the corresponding parent chat 14.

Advantageously, the database 12 is configured and structured in such a way that each message 60 of the message dataset 20 which is exchanged within (and is therefore connected to) a sub-chat 49 is automatically of the reserved type.

Advantageously, the database 12 is configured and structured so that each element 33 of a message 60 exchanged within (and therefore connected to) a sub-chat 49 is automatically of the reserved type. Advantageously, all the messages 60 and/or all the elements 33 of a sub-chat 49 are of the reserved type since the corresponding screen that contains them—and in particular the screen of the related sub-chat 49—is of the reserved type.

Advantageously, the first software module is configured to download—at least temporarily, to the local memory 90 of the device (in which said module is executed)—a sub-chat 49 of the reserved type only after having successfully performed and completed a download unlocking procedure, as described more in detail below. Advantageously, furthermore, a sub-chat 49 of the reserved type—once downloaded to the local memory 90 in the device (following the download unlocking procedure) and once temporarily shown on the device display (without or following the display unlocking procedure)—is then automatically removed from the local memory of the device. Therefore, in this case, in order to be able to view a sub-chat 49 again (that is, to make it switch from the "hidden" state to the "visible" state) it is necessary to carry out a further procedure to unlock the download in advance.

Complete Local Download of Open and Reserved Items

Conveniently, in a first embodiment, the first software module is configured to download to the local memory 90 of the device in which said module is executed, the personal subset 75 of all the items (i.e. both those of the open type and those of the reserved type) which are connected to the user who logged in to the messaging system 2 on that device.

Suitably, in this case, the first software module is also configured so that:
the items of the personal subset 75 that are of the open type (i.e. those that do not have a corresponding record 71' in the reserved item dataset 70' and in which the corresponding code of the shared access key 80 of the chat dataset 18' or of the message dataset 20' or of the elements dataset 22' is not given value or is given value with a predefined value) can always and automatically be shown on the display of the device in which said first module is executed (i.e. without requiring any prior insertion of an individual 5 or shared 80 access key in order to be able to view them), the items of the personal subset 75 which are of the reserved type (i.e. those which have a corresponding record 71' in the reserved item dataset 70' and in which the corresponding code of the shared access key 80 of the chat dataset 18' or of the message dataset 20' or of the elements dataset 22' is given value and not with a predefined value) can only be viewed on the device display following a preventive and correct insertion of a code corresponding to the individual 5 or shared 80 access key.

Conveniently, the first software module executed the device is configured to carry out a display release procedure which is configured to pass the items of the second type (i.e. the "reserved" ones) from the "hidden" state to the "visible" state. Preferably, this procedure includes the following operations:

receives the access code that is entered by the user by acting on the device, in which the first software module is executed, preferably by acting on the keyboard 35 provided in the device or shown on the latter's display, reloads the corresponding screen keeping in memory the access code entered by the user and checks whether, among the items associated with that screen (and in particular the chat implemented in that screen), in the personal subset 75 present in the local memory 90 of the device, there is an item with individual access key 5 or shared access key 80 which corresponds to the one entered, only in case of a positive outcome of the verification, it displays on the corresponding screen of the device 4 display the corresponding item (completely and/or by means of a preview, even partial) having the individual 5 or shared 80 access key given value with the same code entered by the user; on the contrary, on the other hand, in the event of a negative outcome of the verification, said item is not shown on the device display.

Advantageously, items of the reserved type—which by default have the "hidden" status and which, following the unlocking procedure, go to the "visible" status—maintain this "visible" status only temporarily (for a predefined time and/or until the user performs a certain action on the device and/or until a certain event occurs) and then return to the "hidden" state until a further procedure for unlocking the display is performed.

Suitably, the first software module executed in the device is configured so that the items of the second type are temporarily shown on the display of the device itself.

Advantageously, the first software module executed in the device is configured to automatically remove the display, from the device display, of said items of the reserved type (and thus to pass them from the "visible state" to the "hidden" state) after a predefined interval of time has elapsed, which preferably can be set by the user.

Advantageously, the first software module executed in the device is configured to automatically remove the display, from the device display, of said items of the reserved type (and thus to pass them from the "visible" state to the "hidden" state) following a particular action that the user performs on the device (for example a double "tap" on a certain area of the touch-screen and/or a long press of a certain key).

Advantageously, the first software module executed in the device 4 is configured to automatically remove the display, from the device display, of said items of the reserved type (and thus make them switch from the "visible state" to the "hidden" state) following an event triggered by one or more of the following actions:

action (for example by "tap") on a dedicated button that is displayed on a screen implemented on the touch-screen display of the device, action to have the dedicated messaging system application go in the background or close, action to set the device lock screen, action to put the device into stand-by status or to turn it off, action to start a new chat 14 within the messaging system, action to return to a previous screen or to change the displayed screen.

Preliminary Local Download Only of the Open Items

In a second embodiment, the first software module is also configured to preliminary download to the local memory 90 of the device, in which said module is executed, only the items of the open type that are connected to the user who logged in to messaging system 2 on that device.

Conveniently, in this way, only the items of the open type are downloaded to the local memory 90 of the device and therefore they are always and automatically visible on the device display without requiring any prior insertion of an individual 5 or shared 80 access key. Conveniently in this case, the first software module is also configured so that the items thus downloaded are always and automatically viewable on the display of the device in which said first module is executed (i.e. without requiring any prior insertion of an individual 5 or shared 80 access key in order to be able to view them).

Advantageously, in this second embodiment, the first software module is also configured to download—at least temporarily, to the local memory 90 of the device (in which said module is executed)—the items of the reserved type and this only following the prior and correct insertion by the user of a code corresponding to said individual 5 or shared 80 access key.

In particular, the first software module executed in the device and the second software module executed in the central unit 8 are configured to interface with each other in in order to perform a download unlocking procedure which is configured to locally download items of the reserved type. Preferably, this procedure includes the following operations:

the first software module of the device sends to the second software module of the central unit 8 a code which the user enters by acting on his device, preferably by acting on the keyboard 35 provided in the device or shown on the display of the latter, the second software module of the central unit 8 verifies the received data and, in particular, checks within the central database 12, if—for that particular user who has logged in to the messaging system—there is an item having individual 5 or shared 80 access key corresponding to the code entered by the user, only in case of a positive outcome of the verification, the first software module downloads from the central unit 8 to the local memory of the device (in which said module is executed) the corresponding item (completely and/or by means of a preview, even partially) having the individual 5 or shared 80 access key given value with the same code entered by the user; on the contrary, on the other hand, in the event of a negative outcome of the verification, the first software module does not perform any download.

Therefore, preferably, once downloaded to the local memory of the device, these items of the reserved type can also be viewed directly on the device display (without requiring any procedure to unlock the display). Conveniently, in this case, when the items of the reserved type, which by default have the "hidden" status, are downloaded to the local memory of the device—following the download unlock procedure—they also automatically switch to the "visible" status and keep the "visible" state only temporarily (for a predefined time and/or until the user performs a certain action on the device and/or until a certain event occurs) and then returns to the "hidden" state and keep it until a further procedure is performed unlock download.

Alternatively, once downloaded to the local memory of the device in which the first software module is run, these items are shown on the display of said device only following a further preventive and correct entry by the user of a code corresponding to said key individual access 5 or shared access 80 (i.e. by carrying out a display release procedure as described above). Conveniently, in this case, when the items of the reserved type, which by default have the "hidden" status, are downloaded to the local memory 90 of the device—following the download unlock procedure—they still have the "hidden" status and pass to the "visible" status only following a procedure to unlock the display. Furthermore, these items maintain this "visible" state only temporarily (for a predefined time and/or until the user performs a certain action on the device and/or until a certain event occurs) and then return to the "hidden" state and keep it until an additional download unlocking procedure is not performed.

Advantageously, the items of the reserved type—once downloaded into the local memory 90 in the device (following the download unlocking procedure) and once temporarily shown on the device display (without or following the display unlocking procedure)—are then automatically removed from the local storage of the device. Therefore, in this case, to be able to view them again (i.e. to make them switch from the "hidden" state to the "visible" state) it is necessary to carry out a further procedure to unlock the download in advance.

Individual or shared/common access key Conveniently, the code with which the individual access 5 (i.e. ACCESS_KEY in the reserved dataset item 70 or 70') or shared/common 80 (i.e. ACCESS_KEY_CHAT in the chat dataset 18 or 18') key field is given value for the display of items of the reserved type can include:
  a sequence of alphanumeric characters and/or special characters and/or punctuation symbols, and/or
  a sequence of graphic elements 33 of the type which, within the messaging system, are sent within the screen area occupied by a message (preferably within a frame or balloon 59); advantageously, these graphic elements comprise symbols, icons or images in general to be inserted/chosen on the insertion keyboard 35 which is shown on the display of the device and, preferably, these images represent a concept, an emotion or a mood, substantially correspondingly to the "emoji",
  a media sequence available in the device memory,
  answers to open-ended questions,
  biometric codes (e.g. fingerprint, retina, iris, facial or voice recognition, etc.).

Preferably, the individual 5 or shared/common access key field 80 (which basically constitutes a "password") can be defined by a sequence of graphic elements of the same type that can be inserted inside the balloon of a message, alone and/or between and in line with the text of the message itself.

Suitably, the first software module is configured so that the code corresponding to the individual 5 or shared/common 80 access key—which is entered and inserted by the user by acting on the device in which said software module is executed, and this in order to pass an item of the reserved type from the hidden state to the visible state—is shown, during the same insertion, on the display of the device itself, possibly in a mode in which the individual components of the code are obscured in the traditional way by using appropriate symbols (e.g. asterisks or dots).

Alternatively, the first software module is configured so that the code corresponding to the individual 5 or shared/common 80 access key—which is entered and inserted by the user by acting on the device in which said software is run, and this in order to pass an item of the reserved type from the "hidden" state to the "visible" state—it is not shown in any way on the display of the device itself, and in particular, even the individual components of said code are not obscured. In other words, when the user acts on the typing keyboard 35 to enter the aforementioned code, the screen implemented on the display showing the device (or at least the portion of the screen not occupied by said keyboard 35) remains substantially the same.

Figure 5:
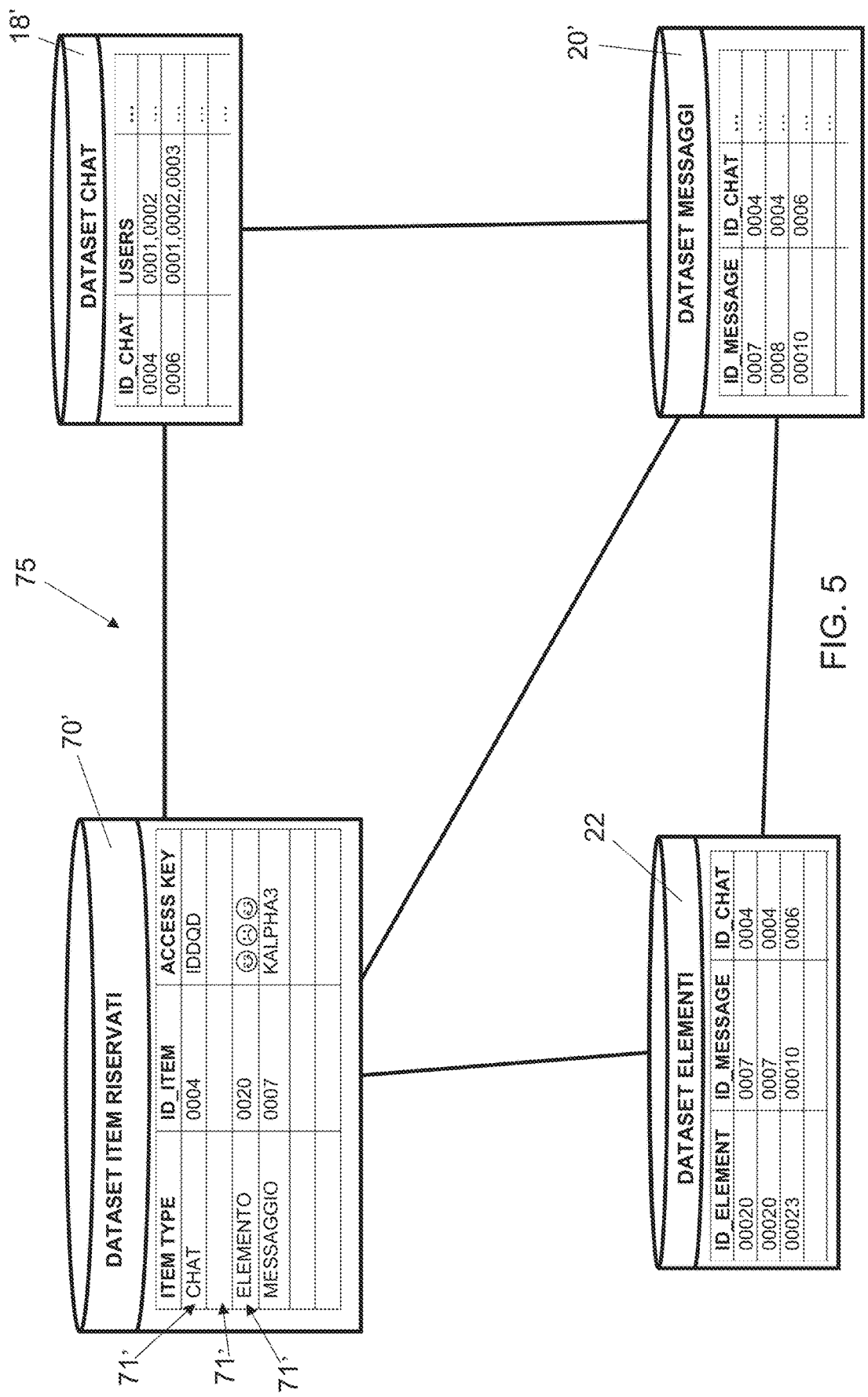
FIG. 5 shows in schematic view an example of the local subset downloaded on the device managed by the user "0001" and derived from the centralized database of FIG. 4.
Figure 6:
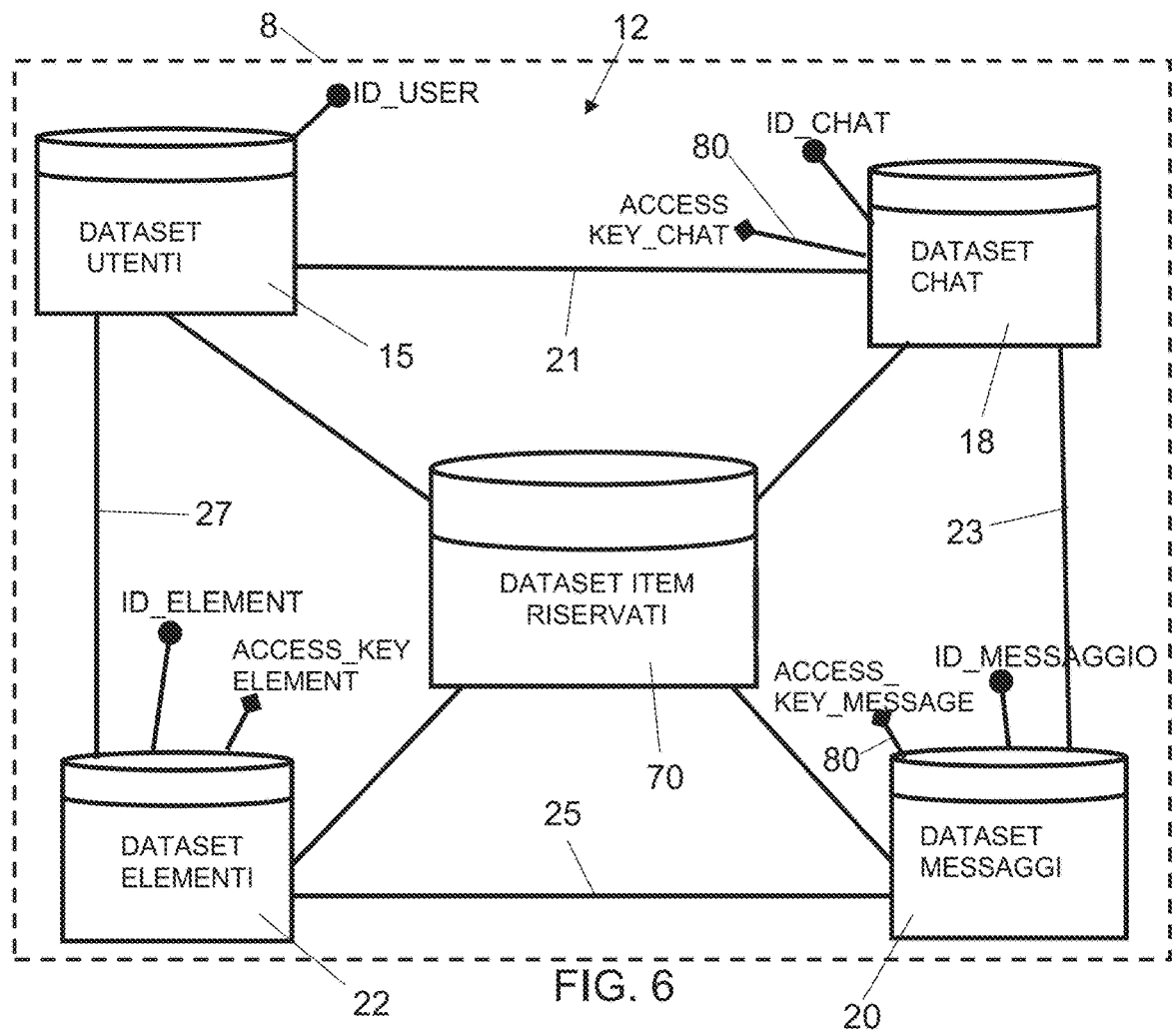
FIG. 6 shows in schematic view a variant of the centralized database on which the infrastructure of the messaging system according to the invention is based.
Figure 7:
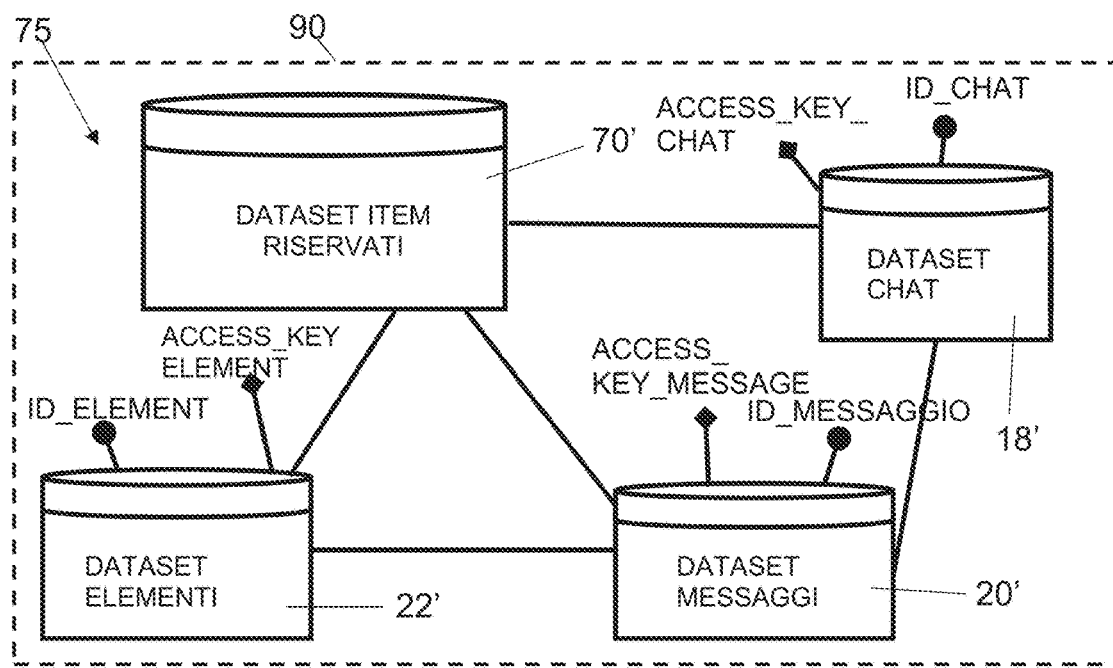
FIG. 7 shows in schematic view a variant of the local subset which is loaded locally on a device managed by a specific user and that derives from the centralized database of FIG. 6.
Figure 8:
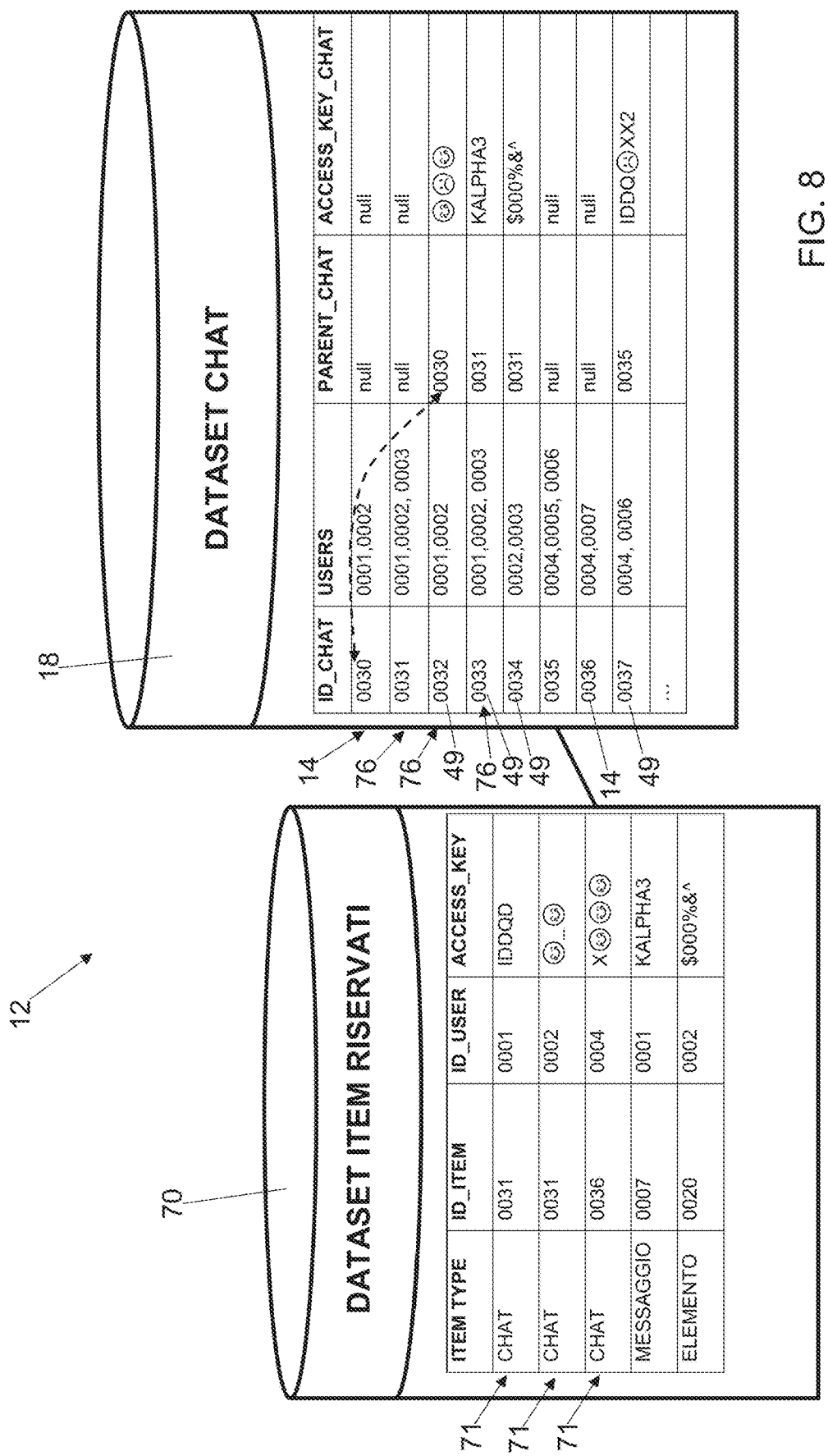
FIG. 8 shows a schematic view of a detail of the database of FIG. 6 which is configured for the management of sub-chats and which has been populated as an example.

Preferably, the first software module is configured so that the method for entering the code corresponding to the individual 5 or shared/common 80 access key—and this in order to pass an item of the reserved type from the "hidden" state to the "visible" state—is automatically activated following the insertion, by means of the typing keyboard 35, of a specific sequence (tag) of pre-coded characters/symbols/graphic elements 61 upstream and/or downstream of said access key 5 (see FIG. 5) or following a particular action performed by the user on the device (for example a double "tap" on a certain area of the touch-screen and/or a long press of a certain key).

Suitably, the sequence of pre-coded characters/symbols/graphic elements which acts substantially as a "tag" is entered upstream and downstream of the access key 5. Basically, therefore, when the first software module receives a certain sequence of characters/symbols/precoded graphic elements or when it senses a particular action, said module activates and automatically enters a "listening" mode so that subsequent insertions made using the typing keyboard 35 are considered as components of the code defining the individual 5 or shared/common 80 access key.

Mode of Action within the Messaging System

Advantageously, the first software module is configured so that:
  an item is of the reserved type since its creation (initialization), and/or
  an item, already created and initialized, of the open type is converted into said reserved type, or vice versa.

Suitably, for this purpose, the first software module is configured to allow the user to act in a first mode (called "secretion") in which, in an automatic way, all the new items created (i.e. one or more chat 14 and/o one or more messages 60) or used (i.e. one or more elements 33 inserted within a message) are of the reserved type. In particular, in this case, the first software module is configured so that the activation of the first mode ("secretion") is associated/subordinated to the insertion/typing of an individual access key 5 so that the latter is automatically associated with all the items that are created or used by acting in this first mode.

Suitably, the first software module can be configured to allow the user to act in a second mode (called "public") in which all the items created (i.e. one or more chat 14 and/or one or more messages 60) or used (i.e. one or more graphic and/or audio elements 33 inserted inside a message) are of the open type. Advantageously, in this case, the first software module can be configured to allow the user to select one or more items and, after entering/typing a corresponding individual access key (which is thus automatically associated with said items, creating a corresponding record 71 in the reserved dataset item 70), these become of the reserved type.

Preferably, to activate/enter the first mode (called "secretion") and/or convert the selected items from the type open to the reserved type, a dedicated icon (hereinafter referred to as "secret icon") is implemented on the screens shown on the device display. to be selected, for example by a touch ("tap") or a click of a pointer.

Screens

Suitably, the first software module is also configured to implement on the screen of the device 4, 6 a plurality of screens relating to the different functions implemented in the messaging system 2 according to the invention.

Advantageously, the first software module is configured so that a typing keyboard 35 is displayed on the device display in which, in one or more pages, the alphanumeric characters, the special characters, the punctuation symbols and the graphic and/or audio elements 33. Preferably, the typing keyboard 35 is implemented so as to occupy the lower part of the device display.

Advantageously, the first software module is configured so as to implement, within the screens shown on the device display, corresponding selectable zones 47 (preferably defined by dedicated icons 47' and/or suitably defined from a graphic point of view) that, when they are selected following an external activation event (for example a short touch "tap" in the case of a "touch-screen" type display, or by clicking, for example with a pointer), they command the activation of one or more corresponding dedicated features. Suitably, said selectable zones 47 are identified by an icon 47', or a dedicated writing, which represents or is connected to the corresponding functionality to be activated.

Display of Items of the Reserved Type

Advantageously, the first software module is configured so that the items of the reserved type, when they are in the "visible" state (and are therefore displayed within a screen implemented on the device display), are displayed together with the items of the open type. Preferably but not necessarily, in this case, the first software module can be configured so that the items of the reserved type, when they are in the "visible" state, have a graphic aspect (for example in terms of color and/or shades and/or boxes) different from that of the items of the open type.

Alternatively, the first software module is configured so that items of the reserved type, when they are in the "visible" state (and are therefore displayed within a screen implemented on the device display), are displayed alone, that is without any items of the open type.

Operation

The operation of the messaging system 2 according to the invention is clear from what has been described above and, suitably, for illustrative and non-limiting purposes only, some specific functions are described and presented below.

As previously specified, it is reiterated that also hereinafter "item" means one or more chat 14 and/or one or more messages 60 and/or one or more graphic and/or audio elements 33.

Creating an Individual Access Key 5

Conveniently the first software module is configured to create and associate an individual access key 5 to one or more items, once a specific user has logged in to the messaging system 2.

For example, suitably, to do this, the user selects, by means of a predefined action, for example a "tap", a dedicated icon (for example identified by a key symbol) displayed on a screen of the messaging system 2, for example relative to the "User Profile".

Suitably, this selection causes the opening of a page in which various operations to be performed are presented.

The user can conveniently select, by means of a specific action, the operation relating to the creation of an individual access key 5.

Then, the user—using the insertion keypad 35 on the device—enters the access code he has chosen and, ends this operation, by selecting a confirmation icon. Suitably, the action on the confirmation icon automatically causes the appropriate storage of the code entered by the user within the database 12 (i.e. a corresponding record is created for each item in the reserved item dataset 70). In this way, therefore, the code entered by the user, and stored in database 12, can subsequently be used as an access key for displaying one or more items of the reserved type and associated with the user who has logged in to messaging system 2 on that device.

Removing an Individual Key

Conveniently, the first software module is configured to remove a previously created individual access key 5 from the local memory of the device.

Suitably, the first software module is configured so that, by eliminating a previously created individual access key 5, the reserved items associated with it are also automatically eliminated. Alternatively, the first software module is configured so that, by eliminating an individual access key 5 previously created, the items of the reserved type associated with it become of the open type and, therefore, are always visible (i.e. the corresponding record 71 of the reserved dataset items 70).

Creation of an Item of the Type Reserved for a Specific User

Figure 16:
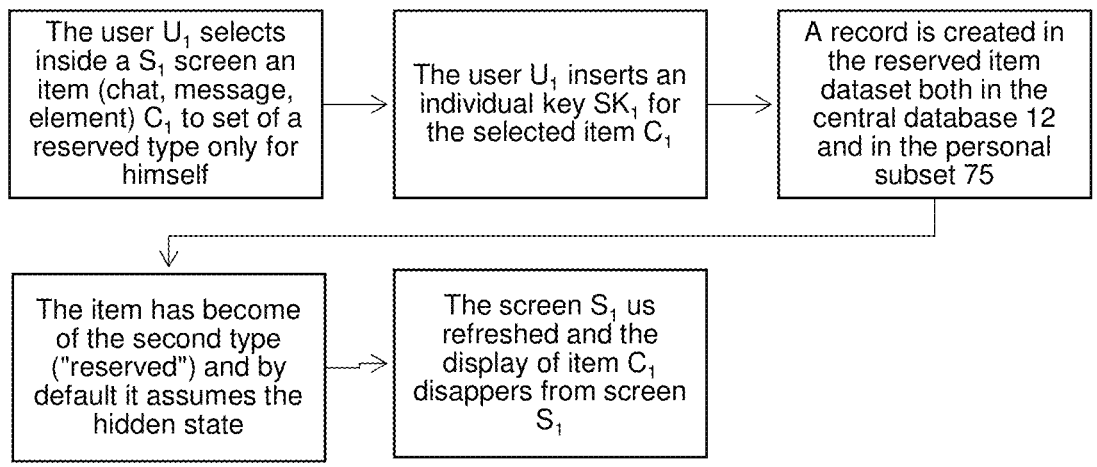
FIG. 16 shows steps that are appropriately provided for the creation of an item type reserved for a specific user.

The steps for the creation of an item type reserved for a specific user are shown in the flow-chart of FIG. 16.

Creating a Chat of the Reserved Type

To create a chat 14 of the reserved type, the user can perform the following operations:
  opening of the "Conversations" screen 42 in which a list (preferably with a partial preview) of the various chats in which that user is a sender or recipient is displayed,
  tapping on the "secret" icon on the "Conversations" screen 42,
  opening of a dedicated screen showing various functions dedicated to the first mode (secretion),
  tapping on icon to create a new chat,
  entering the individual access key 5,
  selecting the recipient's contact.

Alternatively, to create a chat 14 of the reserved type 14", user 16 can perform the following operations:
  creating a new chat 14,
  selecting of the recipient user to chat with,
  tapping on the "secret" icon present in the chat 14 (empty) screen just created,
  entering the individual access key 5,
  confirming that chat 14 is of the reserved type 14",
  inserting of the first message 60 in the chat 14 thus created.

Suitably, it is understood that, within a chat of the reserved 14" type, all the messages exchanged within it, as well as all the graphic and/or audio elements within the messages, are automatically of the reserved type.

Chat Conversion from Open to Reserved Type

To convert a chat 14, already created, from open 14' to reserved 14", the user can perform the following operations:
  opening of the "Conversations" screen 42 in which a list (preferably with a partial preview) of the various chats in which that user is a sender or recipient is displayed, long pressing ("press and hold") or lateral drag ("slide to scroll") on a row of the list of chats of the first ("open") type 14' displayed on the "Conversations" screen to select a specific chat, opening a new menu with different options, tapping on the "secret" icon in the menu, entering the individual access key 5, confirming that the chat has become of the second ("reserved") type 14".

Suitably, it is understood that, within a chat 14 of the reserved type 14", all the messages exchanged within it, as well as all the graphic and/or audio elements within the messages, are automatically of the reserved type.

Creation—within a Chat of the Open Type—of One or More Messages of the Reserved Type To create within a chat of the open type one or more messages 60 of the reserved type 60", the user can carry out the following operations:

opening of a specific chat 14 of the open type 14' within a screen 57, taping on the "secret" icon on the screen relating to that particular chat, entering the individual access key 5, typing a message 60 which then, since its creation/insertion, will be of the reserved type 60".

Conversion—within an Open Type Chat—of One or More Messages from the Open Type to the Reserved Type To convert, within an open type chat, one or more messages 60 from the open type 60' to the second reserved type 60", the user can do the following:

opening of a specific chat 14 of the open type 14' within a screen 57, long pressing ("press and hold") on the area of the screen occupied by a message 60 displayed on the screen of that specific chat, to select that particular message, tapping on the "secret" icon on the screen relating to that particular chat, entering the individual access key 5, confirming that the message 60 thus selected has become of the reserved type 60" and, preferably, the display of this message disappears from the corresponding chat screen 57.

Conversion—within a Chat and Message of the Open Type—of an Element of the Reserved Type To convert within a message 60 of a chat 14, both of the open type, one or more graphic and/or audio elements 33 from the open 33' to the reserved 33" type, the user can perform the following operations:

opening of a specific chat 14 of the open type 14' within a screen 57, long pressing ("press and hold") on the display area which, within a message 60 (displayed on the screen of that specific chat), is occupied by a specific graphic and/or audio element 33, to thus select that particular element, tapping on the "secret" icon on the screen relating to that particular chat, entering the individual access key 5, confirming that the graphic and/or audio element 33 thus selected has become of the reserved type 33" and, preferably, the visualization of this element from the corresponding screen 57 of the chat disappears.

Display Unlock Procedure (See FIG. 14a-14d)

Figure 9A:
FIG. 9*a* shows a screen in which a list of only the "open" type chats are displayed, while the chats of the reserved type are located in the hidden state.
Figure 9B:
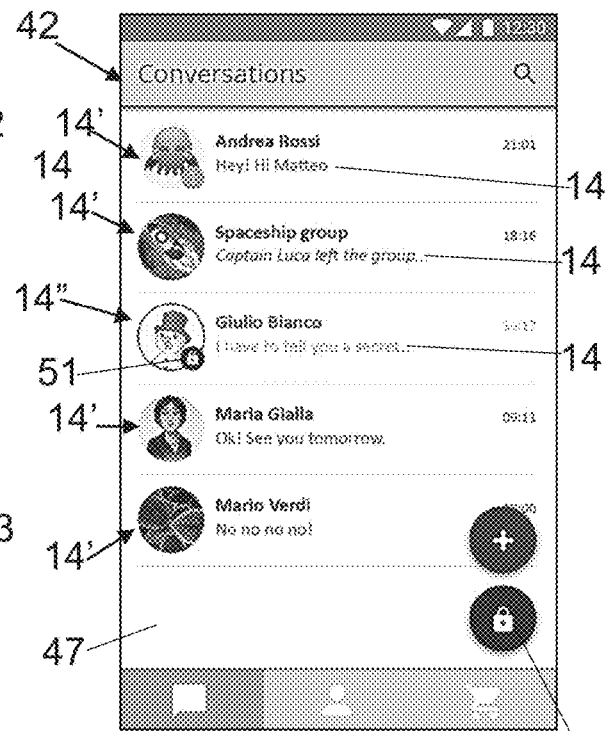
FIG. 9*b* shows the screen of FIG. 9*a* after the procedure for unlocking the display of reserved type chats, which thus pass from the hidden state to the visible state.
Figure 10A:
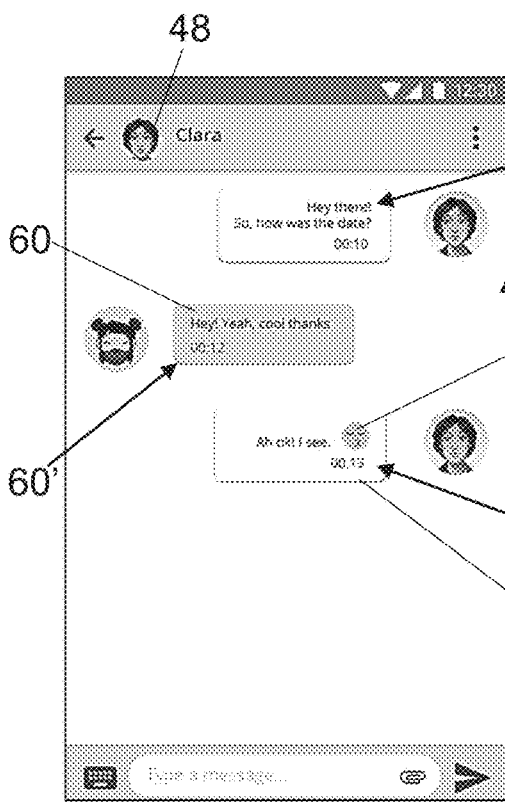
FIG. 10*a* shows a screen in which a chat is displayed with the related "open" type messages, while the reserved type are in the hidden state.
Figure 10B:
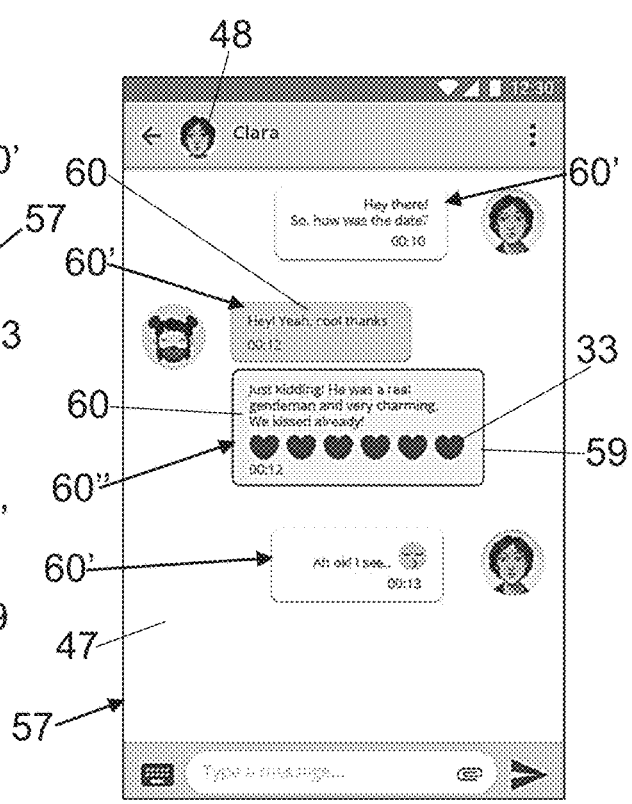
FIG. 10*b* shows the screen in FIG. 10*a* after the procedure for unlocking the display of reserved type messages, which thus pass from the hidden state to the visible state.
Figure 13A:
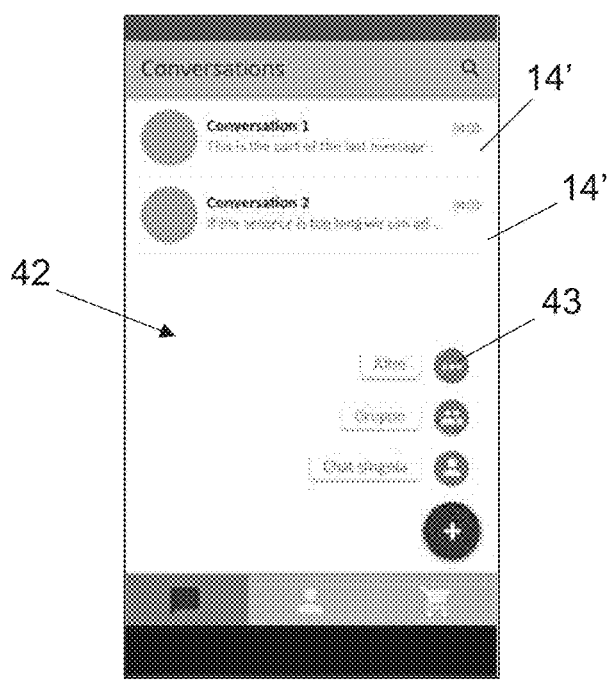
Figure 13B:
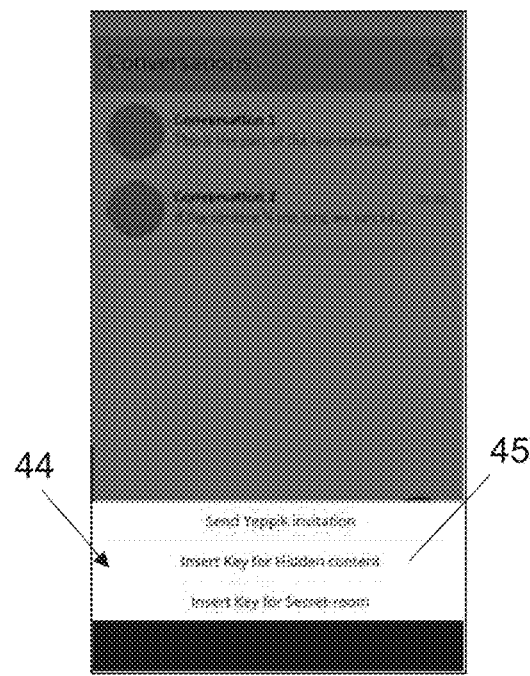
Figure 13C:
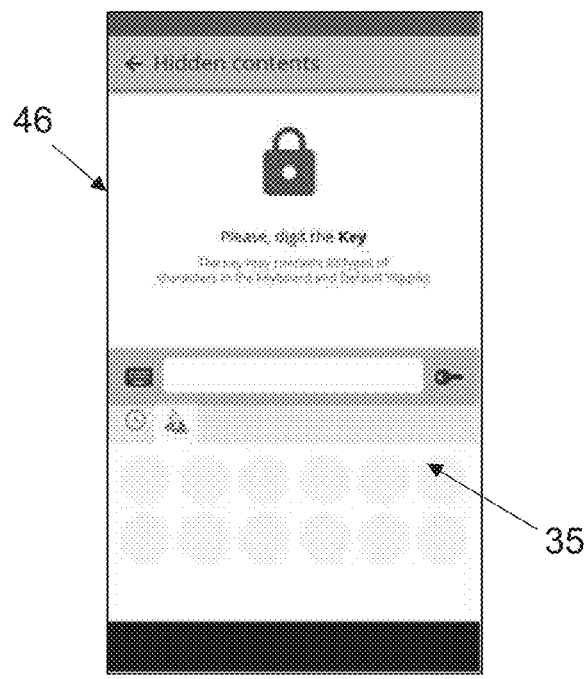
Figure 13D:
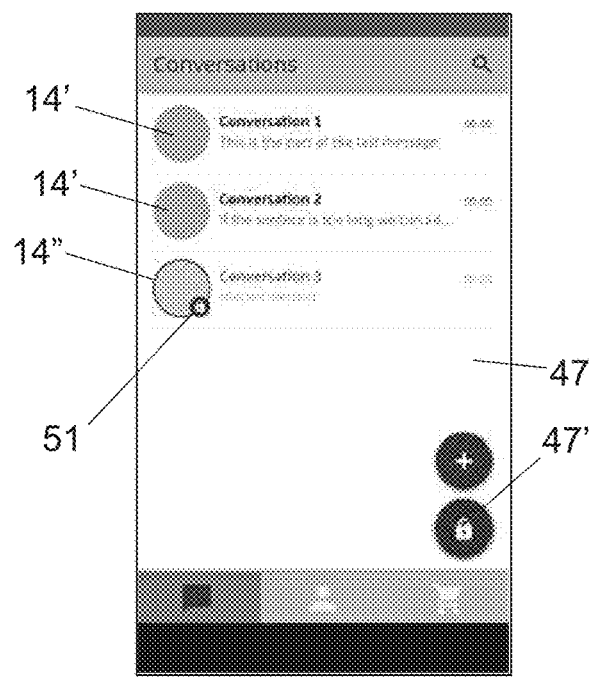
Figure 14A:
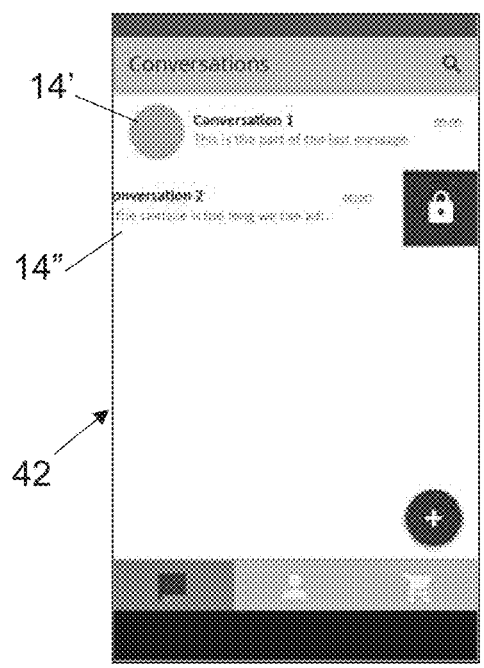
Figure 14B:
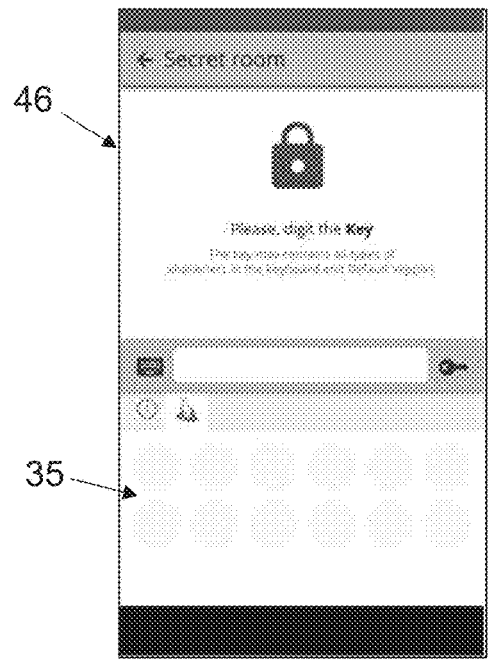
Figure 14C:
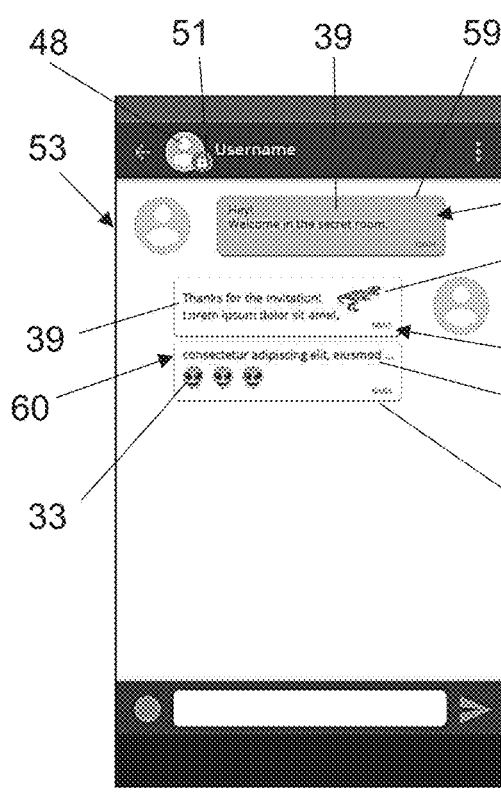
Figure 15:
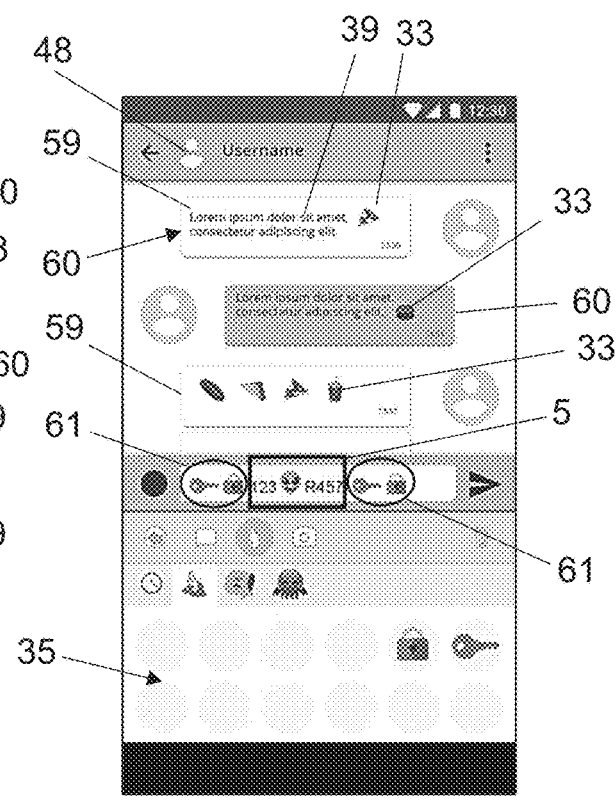
FIG. 15 shows a screen during the insertion phase of the access key.

Advantageously, for the display unlock procedure in order to pass an item (chat, one or more messages, one or more graphic and/or audio elements) of the second ("reserved") type from the "hidden" state to the "visible" state, the user can perform the following operations:

opening of the "Conversations" screen 42 in which a list (preferably with a partial preview) of the various chats 14' is displayed, only of the open type, in which that user is a sender or recipient, tapping on the choice icon 43 on the "Conversations" screen 42, opening a menu 44 in which various functions are displayed, tapping on function 45 of the menu relating to the display of items of the reserved type, opening of a further screen 46 in which to type—preferably using the typing keyboard 35 implemented on the touch-screen display of the device—the components of the code defining the access key, entering the individual access key 5, opening of a screen 47 in which items of the reserved type are displayed/implemented, which therefore have gone from the "hidden" state to the "visible" state; preferably, as shown in FIG. 9b or 13d, the items—and in particular the chats—of the reserved type 14" are distinguished from the graphic point of view from those of the open type 14', for example for the presence of a symbol 51.

Display of Items of a Type Reserved for a Specific User

Figure 17:
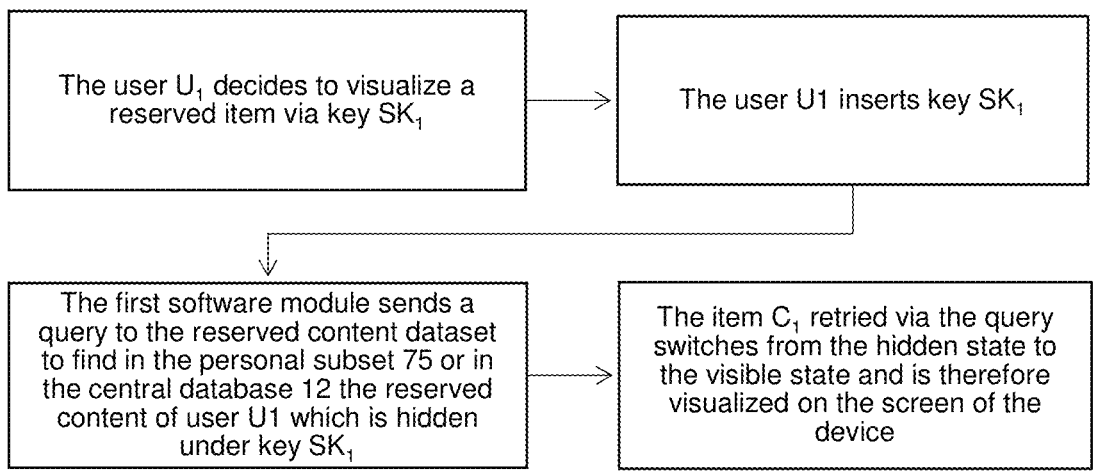
FIG. 17 shows steps that are conveniently provided for viewing an item of a type reserved for a specific user.

The steps for viewing an item of a type reserved for a specific user are shown in the flow-chart of FIG. 17.

Creation of an Access Key that is Shared/Shared Between Two or More Users to Access a Sub-Chat Conveniently the first software module is configured to:

create a common/shared access key 80 to be associated with a sub-chat 49 which derives from a parent chat 14 and to be used to pass said sub-chat (which by default are always and only of the reserved type) from the hidden state to the visible state, and share the common/shared access key 80 thus created with all or a part of the users participating in the parent chat 14 so that the corresponding items of the sub-chat 49 (which are therefore of the reserved type) can be viewed on the displays of the respective devices of the users participating in the sub-chat following the correct insertion of the same common/shared access key 80.

Preferably but not necessarily, once created by a first user participating in the sub-chat, sharing the key with the other users participating in the sub-chat takes place by sending, in a suitably protected mode, which is carried out by means of and within the messaging system 2 according to the invention.

Creation—within an Open Chat—of a Sub-Chat of the Reserved Type (See FIG. 11)

To create a sub-chat 49 of the reserved type within a chat (which will become the corresponding parent chat 14) of the open type 14', a user participating in the parent chat can perform the following operations:

opening of the "Conversations" screen 42 in which a list (preferably with a partial preview) of the various chats of the first type 14' (potential parent chat) in which that user is a sender or recipient is displayed, long pressing ("press and hold") or side drag ("slide to scroll") or "tap" on a row of the list of chats (potential parent chats) of the first ("open") type displayed on the "Conversations" screen to thus select a specific chat, tapping on "secret" icon 47 on screen 42, opening a further screen 46 in which to type—preferably using the typing keyboard 35 implemented on the device's touch-screen display—the components of the code defining the shared/common access key 80, entering the shared/common access key 80, opening of a further screen 53 in which, relatively or within the parent chat 14 (and therefore among the same participants of the same or for a part of them), a sub-chat 49 of the reserved type is displayed; suitably, the sub-chat 49 will initially be free of messages.

Preferably, the following two further operations are also provided:

sending to the devices of all or a part of the users participating in the parent chat 14 of an invitation to participate in a sub-chat 49 which, also for them, will automatically be of the reserved type, sending to the devices of all or part of the users participating in the parent chat the same common/shared access key 80 so that the sub-chat 49 of the reserved type changes from the "hidden" state to the "visible" state, that is, to display the messages and/or the graphic elements present within the sub-chat 49.

Figure 18:
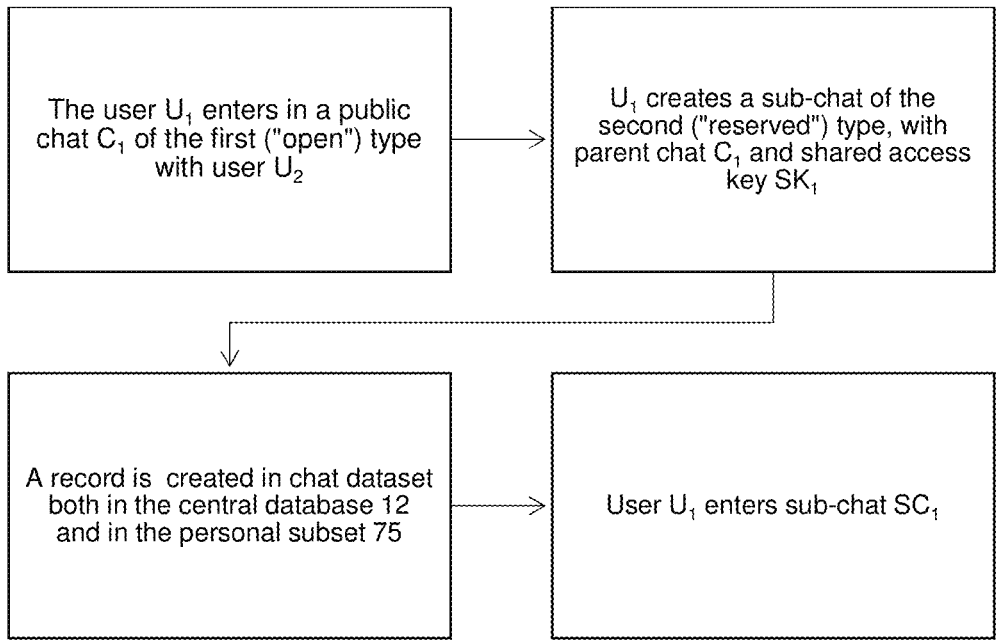
FIG. 18 shows steps for the creation of a sub-chat of a type reserved for participating users.

Preferably, for the creation of a sub-chat of a type reserved for the participating users, the steps are envisaged that are shown in the flow-chart of FIG. 18.

Access—within a Chat of the Open Type—to a Sub-Chat of the Reserved Type—(See FIGS. 12 and 14a-14c)

To access a sub-chat 49 of the reserved type within a parent chat of the open type 14', the user can carry out the following operations:

opening of the "Conversations" screen 42 in which a list (preferably with a partial preview) of the various chats of the open type 14' in which that user is a sender or recipient is displayed, long pressing ("press and hold") or side drag ("slide to scroll") or "tap" on a row of the chat list of the first open type 14' displayed on the "Conversations" screen 42 to select a specific parent chat, tapping on "secret" icon 47 on the screen, entering the shared/common access key 80, opening of a screen 53 in which the sub-chat 49 is displayed (and therefore the messages 60 and/or the graphic and/or audio elements 33 present within the latter) of the reserved type associated with said shared access key/common 80; in particular, in this way, said sub-chat 49 passes from the "hidden" state to the "visible" state.

Figure 19:
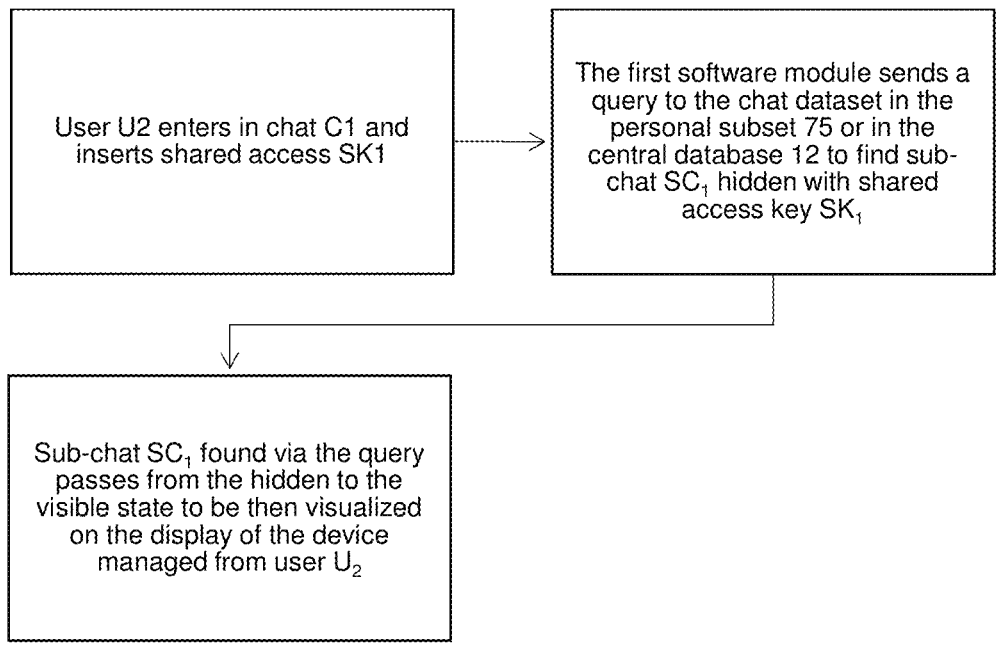
FIG. 19 shows steps for viewing a sub-chat of a type reserved for participating users.

Preferably, to view a sub-chat of a type reserved for participating users, the steps are envisaged that are shown in the flow-chart of FIG. 19.

Removing a Shared/Common Key

Conveniently, the first software module is configured to eliminate a previously created shared/common access key 80, preferably also without requiring the consent of the other users participating in a sub-chat.

Suitably, the first software module is configured so that, by eliminating a previously created shared/common access key 80, the sub-chat of the reserved type associated with it is also automatically eliminated. Alternatively, the first software module is configured so that, by eliminating a previously created shared/common access key 80, the sub-chat of the reserved type associated with it becomes of the open type and, therefore, is always visible.

Conclusions

From what has been said it is clear that the messaging system according to the invention is particularly advantageous in that it allows the user to selectively hide, within the system itself, certain chats and/or messages and/or graphic and/or audio elements. Therefore, in this way, even a third party who had to access the device and the messaging system, could not freely and automatically visualize all the items—with the related contents—present, exchanged and/or used within the messaging system.

In particular, in the messaging system according to the invention, a possible third party who had to access or take possession of the device, not only could never—without having successfully performed the unlock procedure—view and understand the contents of the reserved items but, above all, he could not notice and get to know that there are reserved items. In other words, suitably, in the messaging system according to the invention, a possible third party would have no way of knowing/recognizing whether or not reserved contents (i.e. of the second type) are present or not.

Furthermore, the particular configuration of the database and the reserved item dataset means that the same item exchanged within the messaging system can be of different types (i.e. "reserved" or "public") for the sending user and/or for the recipient user, and may possibly be of different types even among multiple recipient users. For example, it allows to have a situation in which the same chat/message/element is of the second type (reserved) for the sending user, while for the recipient user it remains of the first type (i.e. open), or vice versa.

Furthermore, the particular configuration of the database means that a user can impose that the same item exchanged within the messaging system is of the same type (i.e. "reserved" or "public") for both the sending user and the recipient user or recipient users.

The invention claimed is:

1. A messaging system comprising:

a sending device and a recipient device configured to send and/or receive messages through a central unit, with which the sending and recipient devices are in communication, each of the messages being contained within an individual frame housing one or more textual, graphic, audio, or video elements; and a first software module, which is loaded and executed in the sending and/or recipient device, and a second software module, which is loaded and executed in the central unit, the first software module and/or the second software module being configured so that, within the messaging system, there is created, managed, and exchanged:

a message of a first open type which is always visible within a screen on a device display, and a message of a second reserved type which is configured to switch between:

a visible state, in which the message, entirely and/or in a preview thereof, is displayed within the screen on the device display, occupying a specific area of the screen, and a hidden state, in which the message is not displayed inside the screen, wherein the first software module is configured to enable a user to send automatically all new messages as messages of the second reserved type, wherein the first software module and the second software module are further configured so that the message of the second reserved type passes from the hidden state to the visible state following a successful unlocking procedure carried out on the sending and/or recipient device where the messages are intended to be viewed, wherein the first software module and the second software module are configured so that:

the message of the second reserved type, when in the hidden state, does not occupy the specific area of the screen, and no feedback or visual indication is provided on the device display that allows noticing an existence or presence of the message of the second reserved type within the messaging system, the individual frame of each individual message of the second reserved type in the hidden state being not displayed on the screen of a main chat comprising all messages that are exchanged between at least two users, and the unlocking procedure requires a correct typing, using a keyboard of the sending or the recipient device, on the device display, of an access code associated with the message of the second reserved type, and wherein the unlocking procedure is configured so that, for each attempt having a negative result, no visual feedback is provided on a failure of the attempt, wherein one or both of the first software module and the second software module are configured so that, within the messaging system, there is a sub-chat, which:

is of the second reserved type, derives from the main chat, thus defining a chat that is parallel to the main chat, and is configured so that participants in the sub-chat are only a subgroup of the participants in the main chat, wherein the sub-chat is displayed on a separate window that is different from a window of the main chat, wherein the sub-chat comprises a plurality of messages exchanged in sequence between a sender and at least one participant in the main chat, wherein access to the sub-chat is provided using an access key associated to the sub-chat, wherein the separate window of the sub-chat is displayed automatically after that the access key associated to the sub-chat, which is the same and is made available to all participants in the sub-chat, has been correctly inserted, and wherein the central database is configured and structured so that each message of the message dataset that is exchanged within the sub-chat is automatically of the second reserved type.

2. The messaging system according to claim 1, wherein the messaging system is configured so that the messages of the second reserved type, when in the visible state, are displayed on the screen together and/or among the messages of the first open type when the messages of the first open type are present in the main chat.

3. The messaging system according to claim 1, wherein the first software module is configured so that a message, already created and initialized, as a message of the first open type is converted into the second reserved type, or vice versa.

4. The messaging system according to claim 1, wherein the first software module and/or the second software module are configured so that the message of the second reserved type is downloaded locally onto the sending or the recipient device only if the unlocking procedure, carried out on or with the sending or the recipient device has been successful.

5. The messaging system according to claim 1, wherein the first software module and the second software module are configured so that the message of the second reserved type is by default in the hidden state and change from the visible state to the hidden state automatically after a predefined amount of time, or when the user performs a predetermined action on the sending or the recipient device.

6. The messaging system according to claim 1, wherein the first software module is configured so that an input mode corresponding to an access key code is automatically activated following insertion, using a typing keyboard, of a specific sequence or tag of pre-coded characters, symbols, and/or graphic elements upstream or downstream of the access key code.

7. The messaging system according to claim 1, wherein the first software module executed in the sending or recipient device is configured to carry out a display unlock procedure, which is configured to pass messages, which for a specific user are of the second reserved type, from the hidden state to the visible state.

8. The messaging system according to claim 1, wherein each sending or recipient device acting as a sender or respectively recipient within the messaging system comprises a local memory in which to download and store a personal subset derived from the central database of the central unit and which contains all the data of the main chat or message of a specific user who has logged in to the messaging system using sending or recipient device, and wherein one or both of the first software module or the second software module are configured so as to search for chats or messages of the open type and of the second reserved type, to be then displayed in a corresponding screen of the sending or recipient device, in the personal subset provided in a local memory of the sending or recipient device.

9. The messaging system according to claim 1, wherein the central unit comprises a central database, in which a user dataset, containing a first unique identification code (ID_USER) of each user of the messaging system, is in relation with an elements dataset containing a second unique identification codes (ID_ELEMENT) of all digital elements that can be managed through the messaging system, so as to define the digital elements that are accessible or manageable by each user of the user dataset.

10. The messaging system according to claim 9, wherein the central database is configured and structured so that each message of the message dataset that is exchanged within a sub-chat, and is therefore connected to the sub-chat, is automatically of the second reserved type.

11. The messaging system according to claim 9, wherein the central database comprises a chat dataset, which contains a third unique identification code (ID_CHAT) of each chat of the messaging system, the chat dataset being related to a message dataset, which contains a fourth unique identification codes (ID_MESSAGE) of all messages exchanged within the messaging system, and wherein the chat dataset is related to the user dataset to define users who participate in each chat, and the message dataset is related to the elements dataset so as to connect to each message a digital element that is inserted or contained in each message.

12. The messaging system according to claim 11, wherein the central database comprises a reserved item dataset, which is related to the user dataset, to the chat dataset, to the message dataset, and/or to the elements dataset.

13. The messaging system according to the claim 12, wherein the reserved item dataset is configured so that each record thereof includes:

a first field given value or associated with the second, third, or fourth unique identification code, a second field associated or given value with the first unique identification code (ID_USER) of a user connected to the main chat, the message, or the digital element, and a third field given value with a code that defines an access key connected to the main chat, the message, or the digital element of the record.

14. The messaging system according to the claim 13, wherein one or both of the first software module and the second software module are configured so that, if a specific record is present in the reserved dataset item with the identification code of a specific chat, message, or digital element, then the specific chat, message, or digital element is of the second type reserved only for the user having a unique identification code (ID_USER) corresponding to the second field of the specific record.

15. The messaging system according to claim 13, wherein one or all of the first software module, the second software module, or the central database are configured so that, if within the reserved item dataset there is a specific record with the identification code of a specific chat, message, or digital element, then the display of the sending and recipient devices, which is managed by the user having a unique identification code (ID_USER) corresponding to the second field of the specific record, is subject to a correct insertion by the user of a code corresponding to the access key provided in the third field of the specific record.

16. The messaging system according to claim 13, wherein one or both of the first software module or the second software module are configured so that, within the messaging system, there are:
- a chat of the first open type, which is always visible on the display of the sending and recipient devices managed by all the users participating in the main chat, and
- a chat of the second reserved type, which, as a result of the unlocking procedure, passes between:
- a first hidden state in which the chat of the second reserved type is not shown on the display of the sending and the recipient devices managed by all the users participating in the main chat, and
- a second visible state in which the chat of the second reserved type, entirely or in a preview thereof, is displayed on a screen implemented on the display of the sending and the recipient devices managed by all the users participating in the chat of the second reserved type.

17. The messaging system according to claim 13, wherein the chat dataset comprises at least one field with a code that identifies a shared access key (ACCESS_KEY_CHAT) which is the same for all participants in the main chat, to be entered to allow each chat participant to view a corresponding chat on the display of the corresponding recipient device or a display associated therewith.

18. The messaging system according to claim 13, wherein the chat dataset comprises a field (ACCESS_KEY_CHAT) to be given value with a code that identifies a shared access key, which is the same for all chat participants, and is to be entered to allow each chat participant to download and view a corresponding chat on the display of the sending or recipient device, and wherein one or all of the first software module, the second software module, or the central database are configured so that, if in a specific record of the chat dataset, the field (ACCESS_KEY_CHAT) is valued, then a chat of the specific record is a sub-chat.

19. The messaging system according to claim 13, wherein the chat dataset comprises a field (PARENT_CHAT) to be given value with a unique identification code of a specific chat, and wherein one or all of the first software module, the second software module, or the central database are configured so that, if in a specific record of the chat dataset the field (PARENT_CHAT) is given value, then a chat of the specific record is a sub-chat.

* * * * *